(12) United States Patent
Tanabe et al.

(10) Patent No.: US 9,992,612 B2
(45) Date of Patent: Jun. 5, 2018

(54) POWER SUPPLY APPARATUS CONFIGURED TO WIRELESSLY SUPPLY POWER

(71) Applicant: CANON KABUSHIKI KAISHA, Tokyo (JP)

(72) Inventors: Akihiro Tanabe, Tokyo (JP); Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 14/858,796

(22) Filed: Sep. 18, 2015

(65) Prior Publication Data

US 2016/0085281 A1 Mar. 24, 2016

(30) Foreign Application Priority Data

Sep. 22, 2014 (JP) ................. 2014-192880

(51) Int. Cl.
*H02J 7/00* (2006.01)
*H04W 4/00* (2018.01)
*H02J 50/10* (2016.01)
*H02J 50/60* (2016.01)
*H02J 50/80* (2016.01)
*G06F 1/26* (2006.01)
*H02J 7/02* (2016.01)

(52) U.S. Cl.
CPC ............ *H04W 4/008* (2013.01); *G06F 1/26* (2013.01); *H02J 7/025* (2013.01); *H02J 50/10* (2016.02); *H02J 50/60* (2016.02); *H02J 50/80* (2016.02)

(58) Field of Classification Search
CPC .. H02J 7/025; H02J 50/10; H02J 50/60; H02J 50/80

USPC ......................................................... 320/108
See application file for complete search history.

(56) References Cited

U.S. PATENT DOCUMENTS

| 8,527,786 | B2 | 9/2013 | Nakano | |
|---|---|---|---|---|
| 8,836,279 | B2 | 9/2014 | Nakano | |
| 2003/0015993 | A1* | 1/2003 | Misra | H02J 7/0073 320/125 |
| 2011/0244794 | A1 | 10/2011 | Nakano | |
| 2011/0264297 | A1 | 10/2011 | Nakano | |
| 2012/0001591 | A1 | 1/2012 | Fukaya | |
| 2012/0040613 | A1 | 2/2012 | Nakano | |
| 2012/0256495 | A1* | 10/2012 | Fukaya | H02J 7/0004 307/104 |
| 2013/0342160 | A1 | 12/2013 | Tanabe | |
| 2014/0208131 | A1 | 7/2014 | Kano | |
| 2014/0292094 | A1 | 10/2014 | Tsukamoto | |

(Continued)

FOREIGN PATENT DOCUMENTS

| CN | 102055219 A | 5/2011 |
|---|---|---|
| CN | 102201696 A | 9/2011 |

(Continued)

*Primary Examiner* — Nathaniel Pelton
(74) *Attorney, Agent, or Firm* — Canon U.S.A., Inc. IP Division

(57) ABSTRACT

A power supply apparatus includes a power supply unit configured to wirelessly supply power to an electronic apparatus, a communication unit configured to receive information regarding the electronic apparatus from the electronic apparatus, and a control unit configured to control whether to perform a process for detecting a foreign object according to whether the information is updated by the electronic apparatus.

19 Claims, 11 Drawing Sheets

(56) References Cited

U.S. PATENT DOCUMENTS

| | | | |
|---|---|---|---|
| 2014/0292095 A1 | 10/2014 | Tsukamoto | |
| 2014/0365807 A1 | 12/2014 | Nakano | |
| 2015/0061398 A1 | 3/2015 | Kudo | |
| 2015/0372493 A1 | 12/2015 | Sankar | |
| 2016/0164302 A1* | 6/2016 | Nakano | G01V 3/10 |
| | | | 307/104 |
| 2017/0018977 A1 | 1/2017 | Van Wageningen | |

FOREIGN PATENT DOCUMENTS

| | | |
|---|---|---|
| CN | 103138358 A | 6/2013 |
| CN | 103368275 A | 10/2013 |
| JP | 2001-275266 A | 10/2001 |
| JP | 2008-113519 A | 5/2008 |
| JP | 2012222946 A | 11/2012 |
| JP | 2014007862 A | 1/2014 |
| WO | 2014/103191 A1 | 7/2014 |

\* cited by examiner

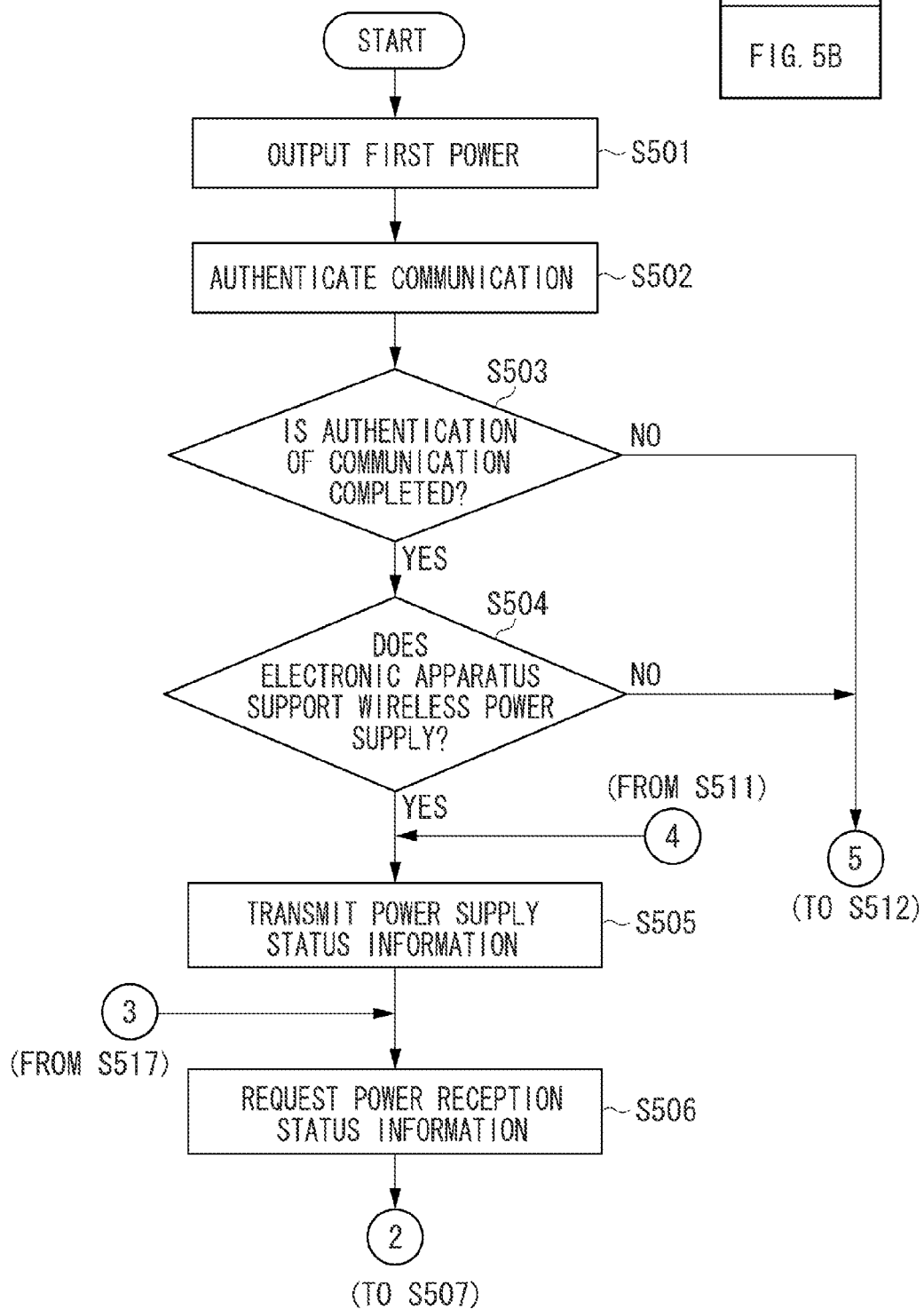

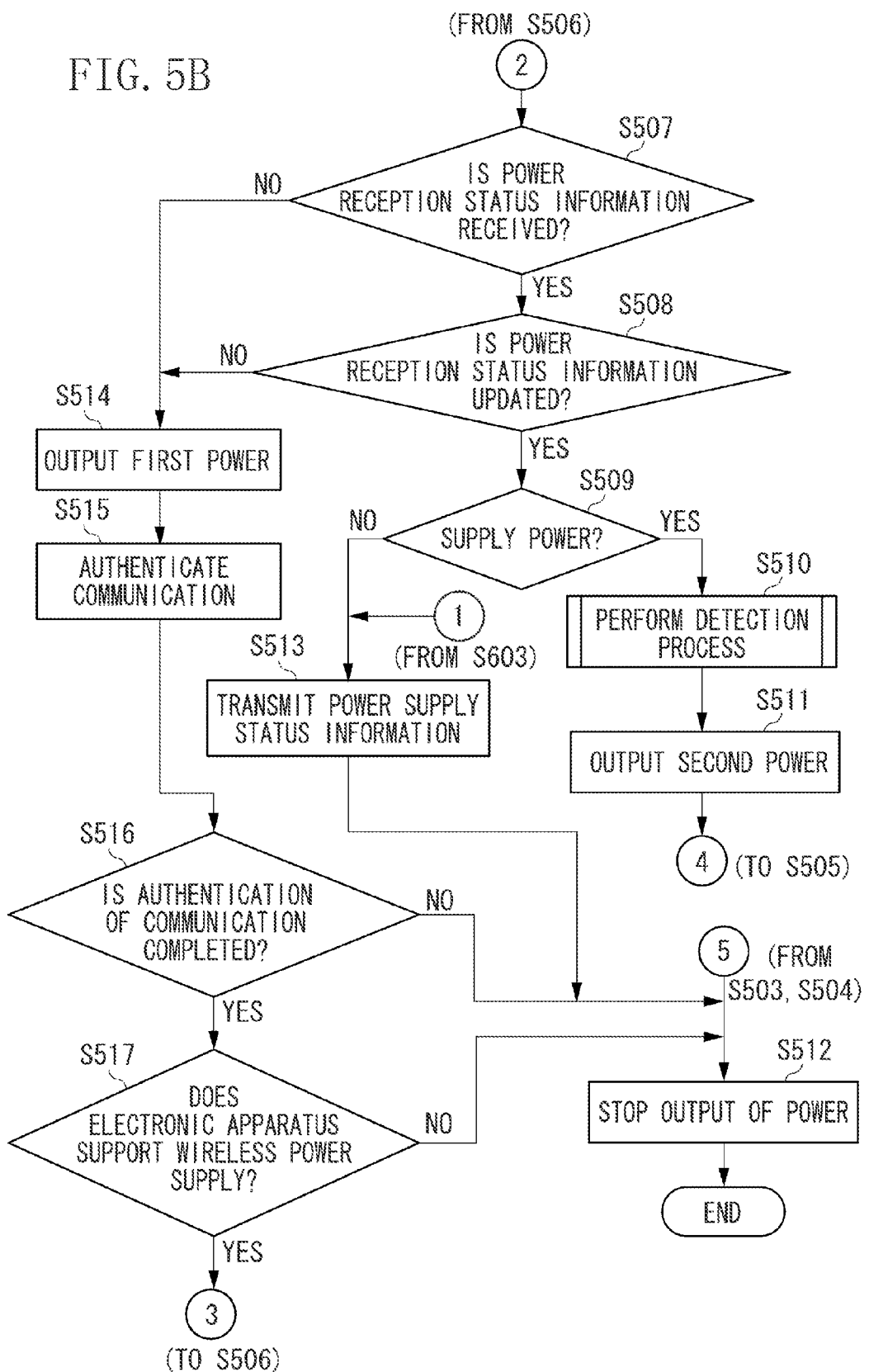

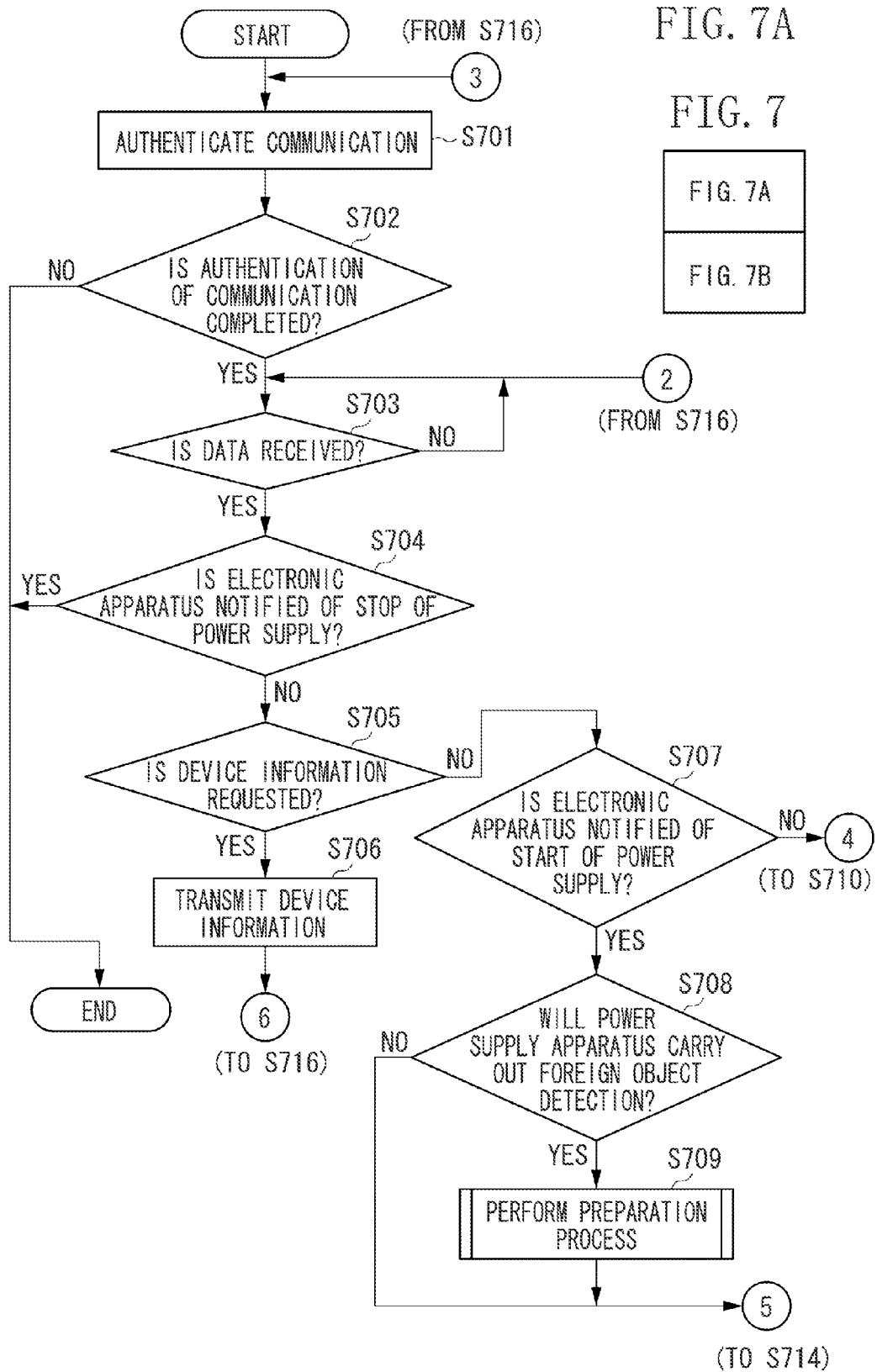

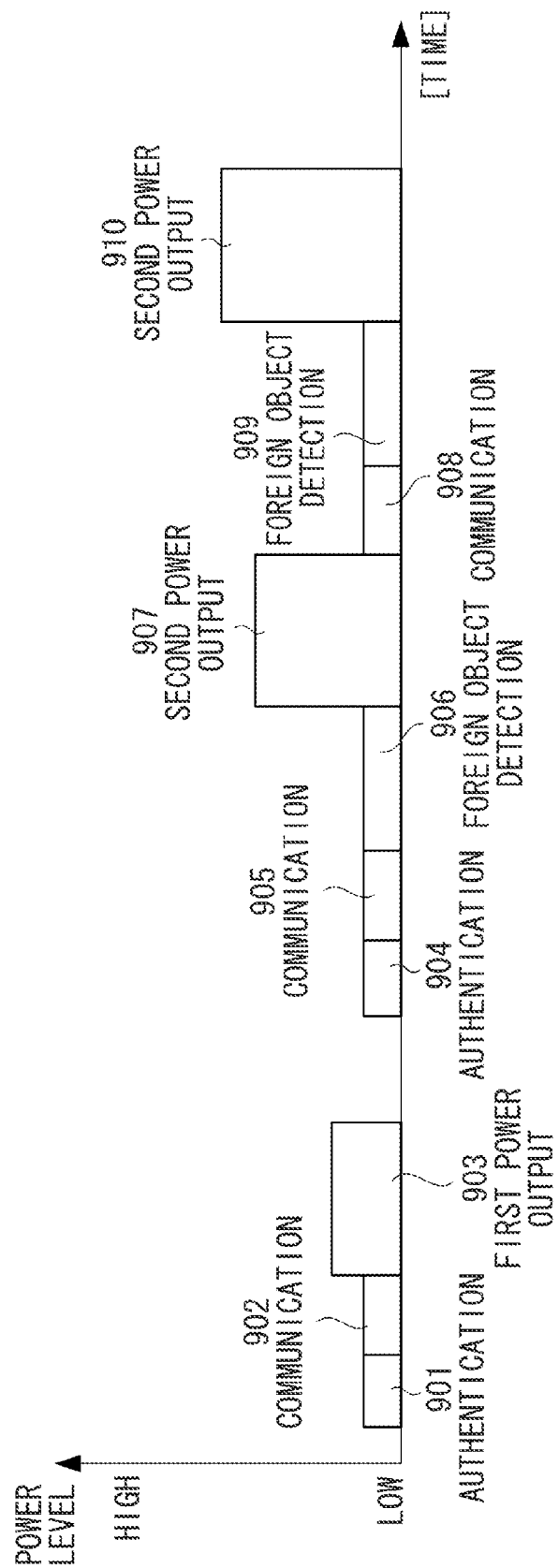

POWER SUPPLY APPARATUS CONFIGURED TO WIRELESSLY SUPPLY POWER

BACKGROUND OF THE INVENTION

Field of the Invention

The present invention relates to a power supply apparatus configured to wirelessly supply power.

Description of the Related Art

In recent years, there has been known a power supply system including a power supply apparatus provided with a primary coil for wirelessly outputting power without being connected via a connector, and an electronic apparatus provided with a secondary coil for wirelessly receiving the power supplied from the power supply apparatus.

In such a power supply system, there has been known that the electronic apparatus charges a battery with use of the power received from the power supply apparatus via the secondary coil as discussed in Japanese Patent Application Laid-Open No. 2001-275266.

SUMMARY OF THE INVENTION

According to an aspect of the present invention, a power supply apparatus includes a power supply unit configured to wirelessly supply power to an electronic apparatus, a communication unit configured to receive information regarding the electronic apparatus from the electronic apparatus, and a control unit configured to control whether to perform a process for detecting a foreign object according to whether the information is updated by the electronic apparatus.

According to another aspect of the present invention, a method for controlling a power supply apparatus includes supplying power wirelessly to an electronic apparatus, receiving information regarding the electronic apparatus from the electronic apparatus, and controlling whether to perform a process for detecting a foreign object according to whether the information is updated by the electronic apparatus.

Further features of the present invention will become apparent from the following description of exemplary embodiments with reference to the attached drawings.

BRIEF DESCRIPTION OF THE DRAWINGS

FIG. 5 (consisting of FIGS. 5A and 5B) is a flowchart illustrating an example of the power supply process according to the first exemplary embodiment.

FIG. 9 illustrates an example of an operation of the power supply apparatus according to the first exemplary embodiment.

DESCRIPTION OF THE EMBODIMENTS

In the following description, an exemplary embodiment of the present invention will be described in detail with reference to the attached drawings.

Figure 1:
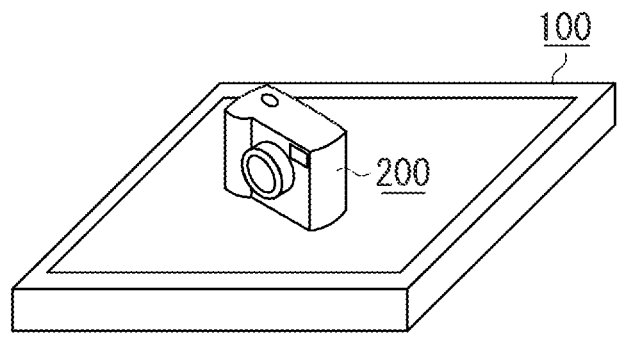
FIG. 1 illustrates an example of a power supply system according to a first exemplary embodiment.

In the following description, a first exemplary embodiment of the present invention will be described in detail with reference to the drawings. A power supply system according to the first exemplary embodiment includes a power supply apparatus 100 and an electronic apparatus 200, as illustrated in FIG. 1. In the power supply system according to the first exemplary embodiment, the power supply apparatus 100 wirelessly supplies power to the electronic apparatus 200, if the electronic apparatus 200 is located within a predetermined range. Further, the electronic apparatus 200 wirelessly receives the power output from the power supply apparatus 100, if located within the predetermined range. On the other hand, the electronic apparatus 200 cannot receive the power from the power supply apparatus 100, if not located within the predetermined range. The predetermined range is defined to be a range that allows the power supply apparatus 100 and the electronic apparatus 200 to communicate with each other. Further, the power supply apparatus 100 may wirelessly supply power to a plurality of electronic apparatuses.

The electronic apparatus 200 may be an imaging apparatus, such as a camera, or may be a reproduction apparatus that reproduces audio data and video data. Alternatively, the electronic apparatus 200 may be a communication apparatus, such as a mobile phone and a smartphone. Alternatively, the electronic apparatus 200 may be a battery pack including a battery 209. Alternatively, the electronic apparatus 200 may be an apparatus such as a vehicle that is driven by the power supplied from the power supply apparatus 100. Alternatively, the electronic apparatus 200 may be an apparatus that receives a television broadcast, a display that displays video data, or a personal computer. Further, the electronic apparatus 200 may be an apparatus that operates with use of the power supplied from the power supply apparatus 100 even without the battery 209 mounted thereon.

Figure 2:
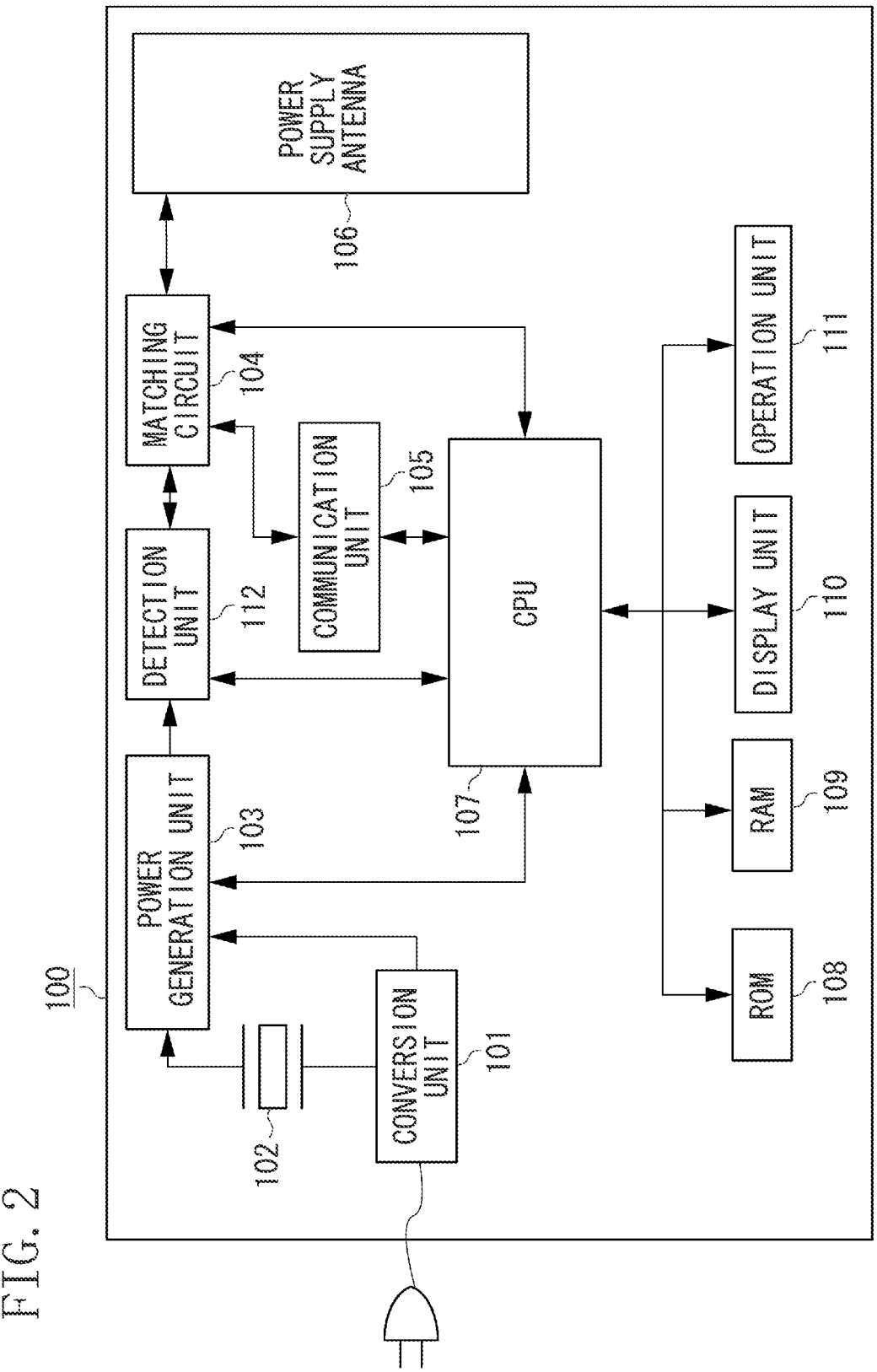
FIG. 2 is a block diagram illustrating an example of a power supply apparatus according to the first exemplary embodiment.

FIG. 2 is a block diagram illustrating an example of a configuration of the power supply apparatus 100. As illustrated in FIG. 2, the power supply apparatus 100 includes a conversion unit 101, an oscillator 102, a power generation unit 103, a matching circuit 104, a communication unit 105, a power supply antenna 106, a central processing unit (CPU) 107, a read only memory (ROM) 108, a random access memory (RAM) 109, a display unit 110, an operation unit 111, and a detection unit 112.

When an alternating-current (AC) power source (not illustrated) and the power supply apparatus 100 are connected to each other, the conversion unit 101 converts alternating-current power supplied from the AC power source (not illustrated) into direct-current power, and supplies the converted direct-current power to the power supply apparatus 100.

The oscillator 102 produces a frequency signal for use to control the power generation unit 103 so as to convert the power supplied from the conversion unit 101 into target power set by the CPU 107. A crystal oscillator or the like is used as the oscillator 102.

The power generation unit 103 generates power to be output to the outside via the power supply antennal 106 based on the power supplied from the conversion unit 101 and the frequency signal produced by the oscillator 102. The power generated by the power generation unit 103 is supplied to the matching circuit 104 via the detection unit 112.

The power generated by the power generation unit 103 includes first power and second power. The first power is power for use to allow the communication unit 105 to communicate with the electronic apparatus 200 via the power supply antenna 106. The second power is power for use to allow the electronic apparatus 200 to charge the battery 209 and perform a predetermined process. For example, the first power is power of 1 W or lower, and the second power is power of 2 W or higher. The first power is defined to be power lower than the second power. Further, the first power may be power specified in a communication standard of the communication unit 105. Further, the first power is not limited to the power of 1 W or lower. Further, the second power is not limited to the power of 2 W or higher as long as the second power is power usable to allow the electronic apparatus 200 to charge the battery 109 and to perform the predetermined process.

The matching circuit 104 is a resonance circuit for achieving resonance between the power supply antenna 106 and a power reception antenna 201 of the electronic apparatus 200. Further, the matching circuit 104 includes a circuit for achieving impedance matching between the power generation unit 103 and the power supply antennal 106. The matching circuit 104 includes a coil (not illustrated) and a capacitor (not illustrated).

When the power supply apparatus 100 outputs any one of the first power and the second power, the CPU 107 controls the matching circuit 104 so as to set a resonance frequency f of the power supply antenna 106 to a predetermined frequency to achieve the resonance between the power supply antenna 106 and the power reception antenna 201. At this time, the CPU 107 changes the resonance frequency f of the power supply antenna 106 by controlling a value of an inductance included in the matching circuit 104 and a value of the capacitor included in the matching circuit 104. Assume that the predetermined frequency is, for example, a frequency of 13.56 MHz.

The communication unit 105 performs, for example, close proximity wireless communication based on the Near Filed Communication (NFC) standard defined by the NFC forum. When the first power is output from the power supply antenna 106, the communication unit 105 can transmit and receive data for wirelessly supplying the power to and from the electronic apparatus 200 via the power supply antenna 106. However, assume that the communication unit 105 does not communicate with the electronic apparatus 200 via the power supply antenna 106 while the second power is output from the power supply antenna 106. When the first power is output from the power supply antenna 106, the communication unit 105 transmits the data to the electronic apparatus 200 by superposing the data onto the first power. When transmitting the data to the power supply apparatus 100, the electronic apparatus 200 modulates a load inside the electronic apparatus 200, which causes a change in a current flowing in the power supply antenna 106. Therefore, the communication unit 105 can receive the data from the electronic apparatus 200 by detecting the current flowing in the power supply antenna 106, and analyzing that.

The data transmitted between the communication unit 105 and the electronic apparatus 200 is data in compliance with NFCData Exchange Format (NDEF).

The power supply antenna 106 is an antenna for outputting the power generated by the power generation unit 103 to the outside. The power supply apparatus 100 supplies the power to the electronic apparatus 200 via the power supply antenna 106, and transmits the data to the electronic apparatus 200 via the power supply antenna 106. Further, the power supply apparatus 100 receives the data from the electronic apparatus 200 via the power supply antenna 106.

The CPU 107 controls the power supply apparatus 100 by executing a computer program stored in the ROM 108. The CPU 107 controls the power to be supplied to the electronic apparatus 200 by controlling the power generation unit 103.

The ROM 108 stores information such as the computer program for controlling the power supply apparatus 100, and a parameter regarding the power supply apparatus 100.

The RAM 109 records the data acquired from the electronic apparatus 200 by the communication unit 105.

The display unit 110 displays video data provided from any one of the RAM 109 and the ROM 108. Further, the display unit 110 displays a warning to a user. The display unit 110 includes a light-emitting diode (LED) 113 or the like. The CPU 107 lights the LED 113 according to an operation performed by the power supply apparatus 100.

The operation unit 111 provides a user interface for operating the power supply apparatus 100. The operation unit 111 includes a power button of the power supply apparatus 100, a mode switching button of the power supply apparatus 100, and the like. Each of the buttons is constituted by a switch, a touch panel, or the like. The CPU 107 controls the power supply apparatus 100 according to an input signal input via the operation unit 111.

The detection unit 112 detects a voltage standing wave ratio (VSWR) to detect a resonance state between the power supply apparatus 100 and the electronic apparatus 200. Further, the detection unit 112 provides data indicating the detected VSWR to the CPU 107. The VSWR is a value indicating a relationship between a traveling wave of the power output from the power supply antenna 106 and a reflection wave of the power output from the power supply antenna 106. The CPU 107 can detect whether a foreign object is placed in the vicinity of the power supply apparatus 100 with use of the VSWR data provided from the detection unit 112.

Figure 3:
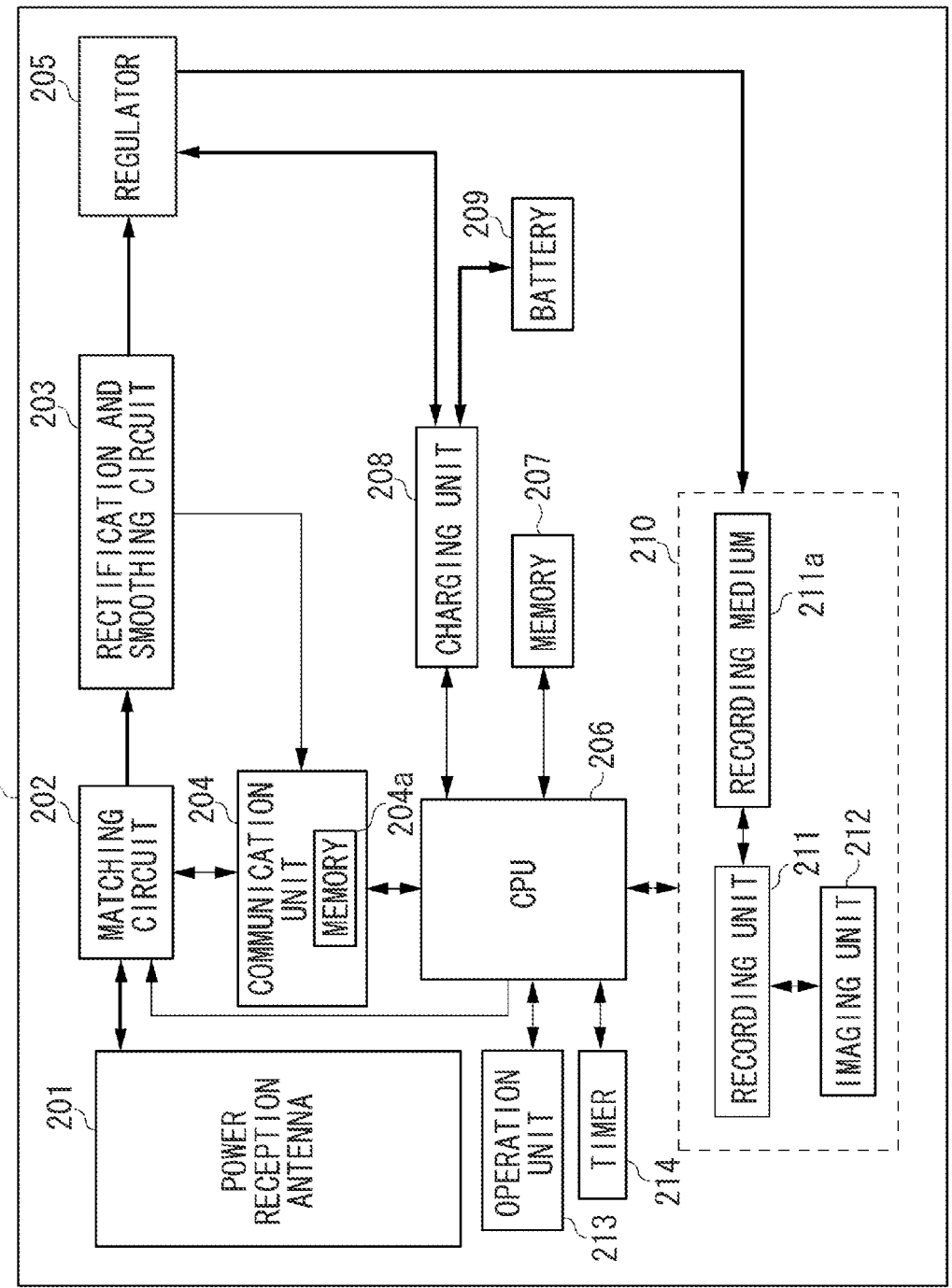
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes the power reception antenna 201, a matching circuit 202, a rectification and smoothing circuit 203, a communication unit 204, a regulator 205, a CPU 206, and a memory 207. Further, the electronic apparatus 200 includes a charging unit 208, the battery 209, a system 210, an operation unit 213, and a timer 214.

The power reception antenna 201 is an antenna for receiving the power supplied from the power supply apparatus 100. The electronic apparatus 200 receives the power from the power supply apparatus 100 via the power reception antenna 201. Further, the electronic apparatus 200 wirelessly communicates with the power supply apparatus 100 via the power reception antenna 201.

The matching circuit 202 is a resonance circuit for achieving the resonance between the power supply antenna 106 and the power reception antenna 201 according to a frequency equal to the resonance frequency f of the power supply antenna 106. Further, the matching circuit 202 includes a circuit for achieving impedance matching between the power reception antenna 201 and the rectification and smoothing circuit 203. The matching circuit 202 includes a coil (not illustrated) and a capacitor (not illustrated). The CPU 206 controls a value of the coil and a value of the capacitor included in the matching circuit 202 in such a manner that the power reception antenna 201 produces an oscillation with the frequency equal to the resonance frequency f of the power supply antenna 106. Further, the matching circuit 202 supplies the power received by the power reception antenna 201 to the rectification and smoothing circuit 203.

The rectification and smoothing circuit 203 removes the data and a noise from the power supplied from the matching circuit 202, and generates direct-current power. Further, the rectification and smoothing circuit 203 supplies the generated direct-current power to the regulator 205. The rectification and smoothing circuit 203 provides the data removed from the power received by the power reception antenna 201 to the communication unit 204.

The communication unit 204 wirelessly communicates with an external apparatus, such as the power supply apparatus 100, according to the same communication standard as the communication unit 105. The communication unit 204 analyzes the data provided from the rectification and smoothing circuit 203, and provides a result of the analysis of the data to the CPU 206. When the first power is supplied from the power supply apparatus 100 to the electronic apparatus 200, the CPU 206 transmits response data as a response to the received data to the power supply apparatus 100. At this time, the CPU 206 controls the communication unit 204 so as to change a load included in the communication unit 204 to transmit the response data as the response to the received data to the power supply apparatus 100. The communication unit 204 includes a memory 204a.

Figure 4:
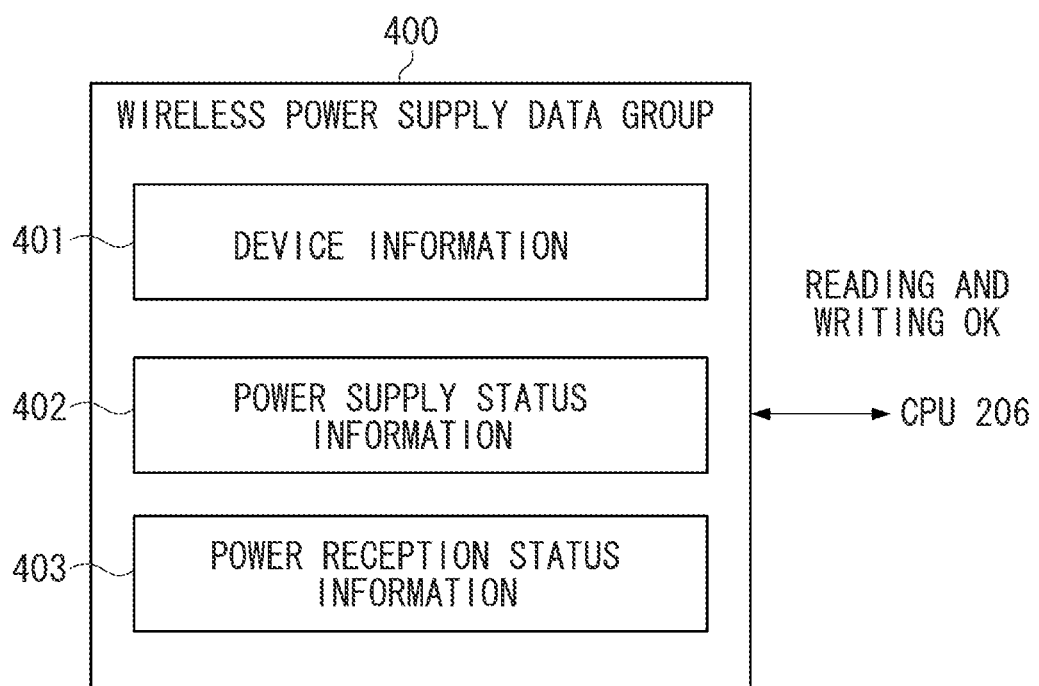
FIG. 4 illustrates an example of wireless power supply data group according to the first exemplary embodiment.

The memory 204a stores a wireless power supply data group 400. FIG. 4 illustrates the wireless power supply data group 400. The wireless power supply data group 400 stores the data transmitted between the power supply apparatus 100 and the electronic apparatus 200. The wireless power supply data group 400 stores device information 401, power supply status information 402, and power reception status information 403. The device information 401, the power supply status information 402, and the power reception status information 403 are data in compliance with NDEF.

The device information 401 includes information for identifying the electronic apparatus 200, information for identifying a power supply method that the electronic apparatus 200 supports, and information indicating a power class of the electronic apparatus 200. Further, the device information 401 includes information indicating the number of power supply methods that the electronic apparatus 200 supports. Therefore, in a case where the electronic apparatus 200 supports a plurality of power supply methods, the device information 401 includes information indicating that the electronic apparatus 200 supports the plurality of power supply methods. Further, the device information 401 includes information indicating a response time, which is a time taken since the power reception status information 403 is requested from the power supply apparatus 100 until the electronic apparatus 200 transmits the power reception status information 403 to the power supply apparatus 100. The information indicating the power class of the electronic apparatus 200 is information indicating a maximum value of the power that the electronic apparatus 200 can receive from the power supply apparatus 100. For example, in a case where the maximum value of the power that the electronic apparatus 200 can receive from the power supply apparatus 100 is 1 W, information indicating that the electronic apparatus 200 supports a low power class is set as the information indicating the power class of the electronic apparatus 200. For example, in a case where the maximum value of the power that the electronic apparatus 200 can receive from the power supply apparatus 100 is 3 W, information indicating that the electronic apparatus 200 supports a middle power class is set as the information indicating the power class of the electronic apparatus 200. For example, in a case where the maximum value of the power that the electronic apparatus 200 can receive from the power supply apparatus 100 is 6 W, information indicating that the electronic apparatus 200 supports a high power class is set as the information indicating the power class of the electronic apparatus 200.

The device information 401 is information transmitted to the power supply apparatus 100 by the communication unit 204. The device information 401 is fixed data stored in the memory 204a in advance.

The power supply status information 402 includes information indicating whether the power supply apparatus 100 starts or stops the wireless power supply to the electronic apparatus 200, information indicating whether an error occurs in the power supply apparatus 100, and update data, which will be described below. The power supply status information 402 further includes information regarding the foreign object detection. The information regarding the foreign object detection includes information indicating whether the power supply apparatus 100 carries out the foreign object detection, and includes information indicating a foreign object detection period during which the power supply apparatus 100 carries out the foreign object detection. Further, the power supply status information 402 may include information indicating a time period during which the second power is output. Further, the power supply status information 402 includes information for identifying a power supply method that the power supply apparatus 100 supports, and information indicating the number of power supply methods that the power supply apparatus 100 supports. Further, the power supply status information 402 includes information indicating a power class of the power supply apparatus 100. The information indicating the power class of the power supply apparatus 100 is information indicating a maximum value of the power that the power supply apparatus 100 can output. For example, in a case where the maximum value of the power that the power supply apparatus 100 can output is 3 W, information indicating that the power supply apparatus 100 supports a low power class is set as the information indicating the power class of the power supply apparatus 100. For example, in a case where the maximum value of the power that the power supply apparatus 100 can output is 10 W, information indicating that the power supply apparatus 100 supports a middle power class is set as the information indicating the power class of the power supply apparatus 100. For example, in a case where the maximum value of the power that the power supply apparatus 100 can output is 20 W, information indicating that the power supply apparatus 100 supports a high power class is set as the information indicating the power class of the power supply apparatus 100.

The power supply status information 402 is information stored into the wireless power supply data group 400 in the memory 204a by the communication unit 105. After the power supply status information 402 is stored into the memory 204a, the CPU 206 can control the electronic apparatus 200 according to the power supply status information 402 by reading out the power supply status information 402.

The power reception status information 403 includes information indicating whether an error occurs in the electronic apparatus 200, information indicating whether the electronic apparatus 200 requests the power supply apparatus 100 to supply the power, and the update data, which will be described below. The power reception status information 403 may further include any one of information for requesting the power supply apparatus 100 to increase the power to be supplied to the electronic apparatus 200, and information for requesting the power supply apparatus 100 to reduce the power to be supplied to the electronic apparatus 200. The power reception status information 403 may further include information for requesting the power supply apparatus 100 to keep the power supplied to the electronic apparatus 200 at a present level.

Further, the power reception status information 403 may further include information regarding a remaining capacity of the battery 209, and/or information regarding charging of the battery 209. Further, the power reception status information 403 may further include information indicating a temperature inside the electronic apparatus 200. The power reception status information 403 may further include information indicating whether the electronic apparatus 200 can perform a preparation process, which will be described below. The power reception status information 403 is information stored into the wireless power supply data group 400 in the memory 204a by the CPU 206. The power reception status information 403 is periodically updated by the CPU 206.

The communication unit 204 consumes lower power than the CPU 206. The communication unit 204 can communicate with the communication unit 105 with use of the power received from the power supply apparatus 100 by the power reception antenna 201 while the first power is output from the power supply apparatus 100.

The regulator 205 performs control so as to cause the power supplied from any one of the rectification and smoothing circuit 203 and the battery 209 to be supplied to the electronic apparatus 200. The regulator 205 supplies the power supplied from the power supply apparatus 100 via the rectification and smoothing circuit 203 to the electronic apparatus 200 according to an instruction from the CPU 206. The regulator 205 supplies discharged power supplied from the battery 209 via the charging unit 208 to the electronic apparatus 200 according to an instruction from the CPU 206.

The CPU 206 controls the electronic apparatus 200 according to the result of the analysis of the data provided from the communication unit 204. Further, the CPU 206 controls the electronic apparatus 200 by executing a computer program stored in the memory 207.

The CPU 206 generates the power reception status information 403 according to information provided from each of the units of the electronic apparatus 200, deletes the power reception status information 403 stored in the memory 204a, and then stores the newly generated power reception status information 403 into the wireless power supply data group 400. Through this operation, the CPU 206 periodically updates the power reception status information 403.

The memory 207 stores the computer program for controlling the electronic apparatus 200. Further, the memory 207 records information regarding the electronic apparatus 200, and the like.

The charging unit 208 charges the battery 209 with use of the power supplied from the regulator 205. Further, when no power is supplied from the regulator 205, the charging unit 208 supplies the discharged power supplied from the battery 209 to the regulator 205. The charging unit 208 periodically detects the information regarding the battery 209 and the information regarding the charging of the battery 209, and notifies the CPU 206 of the detected information.

The battery 209 is a battery attachable to and detachable from the electronic apparatus 200. Further, the battery 209 is a chargeable secondary battery.

The system 210 includes a recording unit 211 and an imaging unit 212.

The recording unit 211 records data such as image data and audio data provided from the imaging unit 212 into a recording medium 211a. Further, the recording unit 211 reads out the data such as the image data and the audio data from the recording medium 211a. The recording medium 211a may be a hard disk, a memory card, or the like, and may be built in the electronic apparatus 200 or may be an external recording medium detachably attached to the electronic apparatus 200.

The imaging unit 212 includes an image sensor for generating the image data from an optical image of an object, an image processing circuit that performs an image process on the image data generated by the image sensor, a compression and decompression circuit for compressing the image data and decompressing the compressed image data, and the like. The imaging unit 212 captures an image of the object, and provides the image data, such as a still image or a moving image, acquired from a result of the image capturing to the recording unit 211. The recording unit 211 records the image data provided from the imaging unit 212 into the recording medium 211a. The imaging unit 212 may further include a configuration required to capture an image of the object.

The system 210 includes a unit to which the power is supplied from the regulator 205 while the electronic apparatus 200 is powered on. Therefore, the system 210 may further include a display unit for displaying the image data, a unit for transmitting and receiving an electronic mail, and/or the like in addition to the recording unit 211, the recording medium 211a, and the imaging unit 212.

The operation unit 213 is a user interface for operating the electronic apparatus 200. The operation unit 213 includes a power button for operating the electronic apparatus 200, a mode switching button for switching a mode of the electronic apparatus 200, and the like. Each of the buttons is constituted by a switch, a touch panel, or the like. When being operated by the user, the operation unit 213 provides a signal corresponding to the operation performed by the user to the CPU 206. The operation unit 213 may control the electronic apparatus 200 according to a remote signal received from a not-illustrated remote controller.

The timer 214 measures a time regarding a process performed by each of the units of the electronic apparatus 200.

Further, each of the power supply antenna 106 and the power reception antenna 201 may be a helical antenna or a loop antenna, or may be a planar antenna, such as a meander line antenna.

In the first exemplary embodiment, the power supply apparatus 100 is configured to wirelessly supply the power to the electronic apparatus 200 based on the magnetic resonance method, but the method for wirelessly supplying the power is not limited thereto.

For example, the power supply apparatus 100 may be configured to wirelessly supply the power to the electronic apparatus 200 based on capacitive coupling, instead of the magnetic resonance method. In this case, an electrode should be mounted on each of the power supply apparatus 100 and the electronic apparatus 200, and the power is wirelessly supplied from the electrode of the power supply apparatus 100 to the electrode of the electronic apparatus 200.

Alternatively, for example, the power supply apparatus 100 may be configured to wirelessly supply the power to the electronic apparatus 200 based on electromagnetic induction, instead of the magnetic resonance method.

The power supply apparatus 100 is configured to wirelessly supply the power to the electronic apparatus 200. However, the term "wirelessly" may be replaced with a phrase "in a non-contact manner" or a phrase "in a contactless manner".

(Power Supply Process)

Next, a power supply process performed by the CPU 107 according to the first exemplary embodiment will be described with reference to a flowchart illustrated in FIG. 5 (consisting of FIGS. 5A and 5B). The CPU 107 executes the computer program stored in the ROM 108, by which the power supply process can be realized.

When the power supply apparatus 100 is powered on, in step S501, the CPU 107 controls at least one of the oscillator 102, the power generation unit 103, and the matching circuit 104 so as to output the first power via the power supply antenna 106. Then, the process proceeds to step S502.

In step S502, the CPU 107 causes the communication unit 105 to carry out authentication for wirelessly communicating with the communication unit 204. Then, the process proceeds to step S503.

In step S503, the CPU 107 determines whether the authentication for wirelessly communicating with the communication unit 204 is completed. If the authentication for wirelessly communicating with the communication unit 204 is completed (YES in step S503), the process proceeds to step S504. If the authentication for wirelessly communicating with the communication unit 204 is not completed (NO in step S503), the process proceeds to step S512.

In step S504, the CPU 107 determines whether the electronic apparatus 200 supports the wireless power supply. For example, the CPU 107 controls the communication unit 105 so as to transmit data for acquiring the device information 401 to the electronic apparatus 200. When the device information 401 is received by the communication unit 105, the CPU 107 determines whether the electronic apparatus 200 supports the wireless power supply with use of the device information 401 received by the communication unit 105. If the electronic apparatus 200 supports the wireless power supply (YES in step S504), the process proceeds to step S505. If the electronic apparatus 200 does not support the wireless power supply (NO in step S504), the process proceeds to step S512.

In step S505, the CPU 107 generates the power supply status information 402, and controls the communication unit 105 so as to transmit the generated power supply status information 402 to the electronic apparatus 200. The power supply status information 402 generated by the CPU 107 in step S505 includes information indicating that the power supply apparatus 100 will start the wireless power supply to the electronic apparatus 200, information indicating that no error occurs in the power supply apparatus 100, and the update data. The update data is used to determine whether the power reception status information 403 is updated by the CPU 206. The update data may be a randomly generated value, or may be a predetermined value. The CPU 107 generates the power supply status information 402 by reading out the update data stored in the RAM 109. The description will be given below, assuming that a value of the update data transmitted to the electronic apparatus 200 in step S505 is set to "N" ("N" is a natural number).

Further, the power supply status information 402 generated by the CPU 107 in step S505 includes information indicating that the power supply apparatus 100 will carry out the foreign object detection, and the information indicating the foreign object detection period. For example, the information indicating the foreign object detection period may be "1 second", or may be "10 seconds".

Upon the transmission of the power supply status information 402 by the communication unit 105, the process proceeds to step S506. The power supply status information 402 transmitted by the communication unit 105 is stored into the wireless power supply data group 400 in the memory 204a.

Upon receiving the power supply status information 402, the communication unit 204 stores the power supply status information 402 received from the power supply apparatus 100 into the wireless power supply data group 400 in the memory 204a. At this time, the communication unit 204 notifies the CPU 206 that the power supply status information 402 is received.

In step S506, the CPU 107 controls the communication unit 105 so as to transmit data for requesting the power reception status information 403 to the electronic apparatus 200. Then, the process proceeds to step S507.

Upon receiving the data for requesting the power reception status information 403, the communication unit 204 notifies the CPU 206 that the power reception status information 403 is requested. Therefore, if sufficient power is supplied from any one of the battery 209 and the rectification and smoothing circuit 203, and if no error occurs in the CPU 206, the CPU 206 performs a process for updating the power reception status information 403 stored in the memory 204a. Upon completing the update of the power reception status information 403 stored in the memory 204a, the CPU 206 reads out the power supply status information 402 from the wireless power supply data group 400 in the memory 204a, and acquires the update data included in the power supply status information 402. After that, the CPU 206 adds a specific value to the value of the update data acquired from the power supply status information 402, and stores the value of the update data with the specific value added thereto into the power reception status information 403. For example, if the value of the update data included in the power supply status information 402 is set to "N", the CPU 206 adds "1", which is the specific value, to the value "N" of the update data after completing the update of the power reception status information 403. After that, the CPU 206 stores the value "N+1" of the update data acquired as a result of the calculation into the power reception status information 403. The CPU 206 does not add the specific value to the update data acquired from the power supply status information 402 until the completion of the update of the power reception status information 403. Therefore, the same update data as the update data included in the power supply status information 402 is stored in the power reception status information 403 stored in the memory 204a until the completion of the update of the power reception status information 403.

However, if the sufficient power is not supplied from the battery 209 and the rectification and smoothing circuit 203, the CPU 206 cannot update the power reception status information 403 stored in the memory 204a. In this case, since the power reception status information 403 stored in the memory 204a is not updated, the same update data as the update data included in the power supply status information 402 is stored in the power reception status information 403 stored in the memory 204a.

Further, even when the sufficient power is supplied from any one of the battery 209 and the rectification and smoothing circuit 203, the CPU 206 cannot update the power reception status information 403 stored in the memory 204a if an error occurs in the CPU 206. In this case, since the power reception status information 403 stored in the memory 204a is not updated, the same value of the update data as the value of the update data included in the power supply status information 402 is stored in the power reception status information 403 stored in the memory 204a.

Upon receiving the data for requesting the power reception status information 403 from the power supply apparatus 100, the communication unit 204 transmits the power reception status information 403 stored in the wireless power supply data group 400 in the memory 204a to the power supply apparatus 100 as response data within the response time. Therefore, if the power reception status information 403 is updated by the CPU 206, the communication unit 204 transmits the updated power reception status information 403 to the power supply apparatus 100 as the response data. On the other hand, if the power reception status information 403 is not updated by the CPU 206, the communication unit 204 transmits the non-updated power reception status information 403 to the power supply apparatus 100 as the response data.

In step S507, the CPU 107 determines whether the power reception status information 403 is received from the electronic apparatus 200 by the communication unit 105 during a time period since the data for requesting the power reception status information 403 has been transmitted until the response time has elapsed. The response time in step S507 is the time indicated by the device information 401. If the power reception status information 403 is received from the electronic apparatus 200 by the communication unit 105 by the elapse of the response time (YES in step S507), the process proceeds to step S508. If the power reception status information 403 is not received from the electronic apparatus 200 by the communication unit 105 even after the response time has elapsed (NO in step S507), the process proceeds to step S514.

In step S508, the CPU 107 determines whether the power reception status information 403 is updated by the electronic apparatus 200.

For example, the CPU 107 analyzes the power reception status information 403 received from the electronic apparatus 200 by the communication unit 105, and acquires the update data included in the power reception status information 403. After that, the CPU 107 determines whether the power reception status information 403 is updated by the electronic apparatus 200 with use of the update data included in the power reception status information 403. At this time, the CPU 107 determines whether the update data stored in the RAM 109 before the reception of the power reception status information 403 in step S507 matches the update data included in the power reception status information 403 received in step S507. If the update data stored in the RAM 109 matches the update data received from the electronic apparatus 200, the CPU 107 determines that the power reception status information 403 is not updated by the electronic apparatus 200 (NO in step S508). On the other hand, if the update data stored in the RAM 109 does not match the update data received from the electronic apparatus 200, the CPU 107 determines that the power reception status information 403 is updated by the electronic apparatus 200 (YES in step S508). For example, if the update data stored in the RAM 109 is set to "N", the CPU 107 determines that the power reception status information 403 is not updated by the electronic apparatus 200 (NO in step S508) if the update data received from the electronic apparatus 200 is set to "N".

On the other hand, if the update data stored in the RAM 109 is set to "N", the CPU 107 determines that the power reception status information 403 is updated by the electronic apparatus 200 (YES in step S508) if the update data received from the electronic apparatus 200 is set to "N+1".

If the power reception status information 403 is updated by the electronic apparatus 200 (YES in step S508), the CPU 107 determines that the power reception status information 403 acquired from the electronic apparatus 200 is correct information, and then the process proceeds to step S509. If the power reception status information 403 is not updated by the electronic apparatus 200 (NO in step S508), the CPU 107 determines that the power reception status information 403 acquired from the electronic apparatus 200 is not correct information, and then the process proceeds to step S514. When the CPU 107 determines that the power reception status information 403 acquired from the electronic apparatus 200 is not correct information, the CPU 107 refrains from using the power reception status information 403 acquired from the electronic apparatus 200 to control the wireless power supply to the electronic apparatus 200.

If the power reception status information 403 is updated by the electronic apparatus 200 (YES in step S508), the CPU 107 deletes the update data stored in the RAM 109, and stores the update data included in the power reception status information 403 into the RAM 109. At this time, if the update data included in the power reception status information 403 is set to "N+1", the CPU 107 stores the value "N+1" of the update data into the RAM 109.

In step S509, the CPU 107 controls whether to supply the power to the electronic apparatus 200 with use of the power reception status information 403 acquired from the electronic apparatus 200. For example, if the power reception status information 403 includes information indicating that the electronic apparatus 200 does not request the power supply apparatus 100 to supply the power, the CPU 107 determines not to supply the power to the electronic apparatus 200 (NO in step S509). If the power reception status information 403 includes information indicating that the battery 209 is fully charged, the CPU 107 determines not to supply the power to the electronic apparatus 200 (NO in step S509). If the power reception status information 403 includes information indicating that an error occurs in the electronic apparatus 200, the CPU 107 determines not to supply the power to the electronic apparatus 200 (NO in step S509). If the power reception status information 403 includes information indicating that the electronic apparatus 200 requests the power supply apparatus 100 to supply the power, the CPU 107 determines to supply the power to the electronic apparatus 200 (YES in step S509). If the power reception status information 403 includes information indicating that the battery 209 is not fully charged, the CPU 107 determines to supply the power to the electronic apparatus 200 (YES in step S509). If the power reception status information 403 includes information indicating that no error occurs in the electronic apparatus 200, the CPU 107 determines to supply the power to the electronic apparatus 200 (YES in step S509).

If the CPU 107 determines to supply the power to the electronic apparatus 200 (YES in step S509), the process proceeds to step S510. If the CPU 107 determines not to supply the power to the electronic apparatus 200 (NO in step S509), the process proceeds to step S513.

In step S510, the CPU 107 performs a detection process for determining whether there is a foreign object within the predetermined range. The detection process will be described below. If the detection process is performed, the CPU 107 can determine whether there is a foreign object within the predetermined range. Upon the execution of the detection process, the process proceeds to step S511.

In step S511, the CPU 107 controls at least one of the oscillator 102, the power generation unit 103, and the matching circuit 104 so as to supply the second power via the power supply antenna 106. In step S511, the CPU 107 sets a magnitude of the second power to be output via the power supply antenna 106 with use of at least one of the device information 401 and the power reception status information 403. After the power supply period has elapsed since the start of the output of the second power, the CPU 107 controls at least one of the oscillator 102, the power generation unit 103, and the matching circuit 104 so as to switch the power to be output via the power supply antenna 106 from the second power to the first power. After that, the process returns to step S505. The power supply period is the time period during which the power supply apparatus 100 outputs the power that allows the electronic apparatus 200 to charge the battery 209 to the electronic apparatus 200. The power supply period may be a time period set by the CPU 107, or may be a predetermined time period. The CPU 107 may be configured to set the power supply time with use of the device information 401 acquired from the electronic apparatus 200. Upon the start of the output of the second power in step S511, the CPU 107 notifies the user that the power supply apparatus 100 is supplying the power to the electronic apparatus 200 by lighting the LED 113. Alternatively, upon the start of the output of the second power, the CPU 107 may notify the user that the power supply apparatus 100 is supplying the power to the electronic apparatus 200 by controlling the display unit 110. After the start of the output of the second power, the process returns to step S505.

When the process of step S505 is performed again after the process of step S511 is performed, the CPU 107 generates the power supply status information 402 including the value of the update data that has been stored into the RAM 109 in step S508. After that, the CPU 107 controls the communication unit 105 so as to transmit the generated power supply status information 402 to the electronic apparatus 200.

In step S512, the CPU 107 controls at least one of the oscillator 102, the power generation unit 103, and the matching circuit 104 so as to stop the output of the power via the power supply antenna 106. Then, the process ends.

In step S513, the CPU 107 generates the power supply status information 402, and controls the communication unit 105 so as to transmit the generated power supply status information 402 to the electronic apparatus 200. The power supply status information 402 generated by the CPU 107 in step S513 includes information indicating that the power supply apparatus 100 will stop the wireless power supply to the electronic apparatus 200. If an error occurs in the power supply apparatus 100, the power supply status information 402 generated by the CPU 107 in step S513 further includes information indicating that an error occurs in the power supply apparatus 100.

Upon the transmission of the power supply status information 402 by the communication unit 105, the process proceeds to step S512. When the power supply status information 402 is transmitted by the communication unit 105, the CPU 107 notifies the user that the power supply from the power supply apparatus 100 to the electronic apparatus 200 is completed by lighting the LED 113. Alternatively, the CPU 107 may notify the user that the power supply from the power supply apparatus 100 to the electronic apparatus 200 is completed by controlling the display unit 110.

When the sufficient power is not supplied from any one of the battery 209 and the rectification and smoothing circuit 203 to the CPU 206, the CPU 206 may be unable to generate the power reception status information 403. In this case, since the power reception status information 403 is not stored in the memory 204a, the electronic apparatus 200 may be unable to transmit the power reception status information 403 to the power supply apparatus 100, even when the power reception status information 403 is requested from the power supply apparatus 100. To solve such a situation, if the power reception status information 403 is not received from the electronic apparatus 200 (NO in step S507), the power supply apparatus 100 supplies the power for charging the battery 209 to the electronic apparatus 200 so that the remaining capacity of the battery 209 increases to a predetermined value or higher. The predetermined value corresponds to the remaining capacity when the battery 209 can supply, to the CPU 206, power required to allow the CPU 206 to generate the power reception status information 403 and store the generated power reception status information 403 into the memory 204a, and power required to allow the CPU 206 to perform the preparation process, which will be described below. When the remaining capacity of the battery 209 is the predetermined value or higher, the CPU 206 can generate the power reception status information 403 and store the generated power reception status information 403 into the memory 204a with use of the power supplied from the battery 209. Further, when the remaining capacity of the battery 209 is the predetermined value or higher, the CPU 206 can perform the preparation process, which will be described below. Therefore, the CPU 107 performs a process of step S514.

When the sufficient power is not supplied from any one of the battery 209 and the rectification and smoothing circuit 203 to the CPU 206, the CPU 206 may be unable to update the power reception status information 403 stored in the memory 204a. In this case, the electronic apparatus 200 may transmit the non-updated power reception status information 403 to the power supply apparatus 100 in response to the issue of the request for the power reception status information 403 from the power supply apparatus 100. To solve such a situation, if the power reception status information 403 is not updated (NO in step S508), the power supply apparatus 100 supplies the power for charging the battery 209 to the electronic apparatus 200 so that the remaining capacity of the battery 209 increases to a predetermined value or higher. When the remaining capacity of the battery 209 is the predetermined value or higher, the CPU 206 can update the power reception status information 403 with use of the power supplied from the battery 209. Therefore, the CPU 107 performs the process of step S514.

In step S514, the CPU 107 controls at least one of the oscillator 102, the power generation unit 103, and the matching circuit 104 so as to output the first power via the power supply antenna 106 to allow the electronic apparatus 200 to charge the battery 209.

When the process of step S514 is performed, the CPU 107 cannot check the state of the electronic apparatus 200 and the state of the battery 209. Therefore, if the power supply apparatus 100 supplies high power to the electronic apparatus 200 as the power that allows the electronic apparatus 200 to charge the battery 209, this may result in supply of excessive power to the electronic apparatus 200. To prevent such a situation, in step S514, the CPU 107 controls at least one of the oscillator 102, the power generation unit 103, and the matching circuit 104 to output the first power, which is expected to be not excessive power for the electronic apparatus 200, to the electronic apparatus 200.

After a predetermined period has elapsed since the start of the output of the first power, the process proceeds to step S515. Upon the start of the output of the first power in step S514, the CPU 107 notifies the user that the power supply apparatus 100 is supplying the power to the electronic apparatus 200 by lighting the LED 113. Alternatively, upon the start of the output of the first power, the CPU 107 may notify the user that the power supply apparatus 100 is supplying the power to the electronic apparatus 200 by controlling the display unit 110.

In step S515, the CPU 107 controls the communication unit 105 so as to temporarily disconnect the wireless communication with the electronic apparatus 200. After that, the CPU 107 causes the communication unit 105 to carry out the authentication for wirelessly communicating with the communication unit 204 again. Then, the process proceeds to step S516.

In step S516, the CPU 107 determines whether the authentication for wirelessly communicating with the communication unit 204 is completed, similarly to step S503. If the authentication for wirelessly communicating with the communication unit 204 is completed (YES in step S516), the process proceeds to step S517. If the authentication for wirelessly communicating with the communication unit 204 is not completed (NO in step S516), the process proceeds to step S512.

In step S517, the CPU 107 determines whether the electronic apparatus 200 supports the wireless power supply, similarly to step S504. If the electronic apparatus 200 supports the wireless power supply (YES in step S517), the process returns to step S506. If the electronic apparatus 200 does not support the wireless power supply (NO in step S517), the process proceeds to step S512.

In the present exemplary embodiment, if the electronic apparatus 200 supports the wireless power supply (YES in step S517), the process returns to step S506. When the power reception status information 403 is not received from the electronic apparatus 200 (NO in step S507), the CPU 206 has been unable to add the specific value to the value of the update data included in the power supply status information 402. In this case, even if the CPU 107 performs the process of step S505 again, this process just results in transmission of the same data as the power supply status information 402 previously transmitted to the electronic apparatus 200 to the electronic apparatus 200. Therefore, the CPU 107 prevents itself from repeating the transmission of the same data to facilitate a quick increase in the remaining capacity of the battery 209 to the predetermined value or higher. For this reason, if the power reception status information 403 is not received from the electronic apparatus 200 (NO in step S507), the CPU 107 performs the process of step S506 without performing the process of step S505.

If the power reception status information 403 is not updated by the electronic apparatus 200 (NO in step S508), the CPU 107 also performs the process of step S506 without performing the process of step S505 in a similar manner, thereby preventing itself from repeating the transmission of the same data.

The CPU 107 is configured to determine, in step S508, whether the power reception status information 403 is updated by the electronic apparatus 200 according to whether the specific value is added by the electronic apparatus 200 to the value of the update data transmitted from the power supply apparatus 100. However, the method for determining the update is not limited thereto. For example, the CPU 206 may cause the communication unit 204 to transmit data generated by subtracting a specific value from the value of the update data received from the power supply apparatus 100 to the power supply apparatus 100, after completing the update of the power reception status information 403. In this case, the CPU 107 is configured to determine, in step S508, whether the power reception status information 403 is updated by the electronic apparatus 200 according to whether the specific value is subtracted by the electronic apparatus 200 from the value of the update data transmitted from the power supply apparatus 100.

Further, for example, the CPU 206 may cause the communication unit 204 to transmit data generated by changing the value of the update data received from the power supply apparatus 100 to the power supply apparatus 100, after completing the update of the power reception status information 403. In this case, the CPU 107 is configured to determine, in step S508, whether the power reception status information 403 is updated by the electronic apparatus 200 according to whether any change is made by the electronic apparatus 200 to the value of the update data transmitted from the power supply apparatus 100.

If the power reception status information 403 is updated by the electronic apparatus 200 (YES in step S508), the CPU 107 may determine that the remaining capacity of the battery 209 is the predetermined value or higher, and determine that the electronic apparatus 200 can perform the preparation process, which will be described below. If the power reception status information 403 is not updated by the electronic apparatus 200 (NO in step S508), the CPU 107 may determine that the remaining capacity of the battery 209 is not the predetermined value or higher, and determine that the electronic apparatus 200 cannot perform the preparation process, which will be described below.

The CPU 107 is configured to control, in step S514, at least one of the oscillator 102, the power generation unit 103, and the matching circuit 104 so as to output the first power to the electronic apparatus 200. However, the power expected not to be excessive power for the electronic apparatus 200 is not limited to the first power. Therefore, the CPU 107 may be configured to cause, in step S514, power other than the first power to be output to the electronic apparatus 200 as long as the CPU 107 causes the power expected not to be excessive power for the electronic apparatus 200 to be output to the electronic apparatus 200.

When the electronic apparatus 200 receives the power supply status information 402 including the information indicating that the power supply apparatus 100 will carry out the foreign object detection, the communication unit 204 transmits response data to the power supply apparatus 100 according to whether the electronic apparatus 200 can perform the preparation process, which will be described below. If the CPU 206 can perform the preparation process, which will be described below, the communication unit 204 transmits information indicating that the electronic apparatus 200 will perform the preparation process, which will be described below, as the response data. If the CPU 206 cannot perform the preparation process, which will be described below, the communication unit 204 transmits information indicating that the electronic apparatus 200 will not perform the preparation process, which will be described below, as the response data. The CPU 206 cannot perform the preparation process, which will be described below, for example, when an error occurs in the CPU 206 or the remaining capacity of the battery 209 is lower than the predetermined value. The CPU 206 can perform the preparation process, which will be described below, for example, when no error occurs in the CPU 206, and the remaining capacity of the battery 209 is the predetermined value or higher.

The power supply apparatus 100 is configured to perform the process of step S511 without performing the process of step S510, if receiving the information indicating that the electronic apparatus 200 will not perform the preparation process after transmitting the power supply status information 402 including the information indicating that the power supply apparatus 100 will carry out the foreign object detection. The power supply apparatus 100 is configured to perform the process of step S511 after performing the process of step S510, if receiving the information indicating that the electronic apparatus 200 will perform the preparation process after transmitting the power supply status information 402 including the information indicating that the power supply apparatus 100 will carry out the foreign object detection.

(Detection Process)

Next, the detection process performed by the CPU 107 in step S510 illustrated in FIG. 5 will be described with reference to a flowchart illustrated in FIG. 6. The CPU 107 executes the computer program stored in the ROM 108, by which the detection process can be realized.

In step S601, the CPU 107 controls at least one of the oscillator 102, the power generation unit 103, and the matching circuit 104 so as to output the first power via the power supply antenna 106. Further, the CPU 107 controls the detection unit 112 so as to start the detection of the VSWR used to determine whether there is a foreign object within the predetermined range.

A foreign object may be placed in advance within the predetermined range when the process of step S601 is performed. Therefore, if the power supply apparatus 100 supplies high power to the electronic apparatus 200 as the power for detecting a foreign object, this may result in supply of excessive power to the foreign object and the electronic apparatus 200. To prevent such a situation, in step S601, the CPU 107 performs control so as to output the first power, which is expected not to be excessive power for the electronic apparatus 200 and the foreign object, to the electronic apparatus 200. Then, the process proceeds to step S602.

In step S602, the CPU 107 determines whether there is a foreign object within the predetermined range. For example, the CPU 107 determines whether there is a foreign object within the predetermined range with use of the information indicating the VSWR that is provided from the detection unit 112. In this case, if an amount of a change in the VSWR detected by the detection unit 112 is a first value or larger, the CPU 107 determines that there is a foreign object within the predetermined range (YES in step S602). The first value is a value corresponding to an amount by which the VSWR is expected to change when a foreign object is placed within the predetermined range. In this case, if the amount of the change in the VSWR detected by the detection unit 112 is not the first value or larger, the CPU 107 determines that there is no foreign object within the predetermined range (NO in step S602). If the CPU 107 determines that there is a foreign object within the predetermined range (YES in step S602), the process proceeds to step S603. If the CPU 107 determines that there is no foreign object within the predetermined range (NO in step S602), the process proceeds to step S604.

In step S603, the CPU 107 notifies the user that a foreign object is detected by lighting the LED 113. Alternatively, the CPU 107 may notify the user that a foreign object is detected by controlling the display unit 110. Then, the process proceeds to step S513 in the power supply process illustrated in FIG. 5. After determining that there is a foreign object within the predetermined range (YES in step S602), in step S513, the CPU 107 controls the communication unit 105 so as to transmit the power supply status information 402 including the information indicating that a foreign object is detected to the electronic apparatus 200.

In step S604, the CPU 107 determines whether the foreign object detection period has elapsed since the detection unit 112 has been controlled so as to start the detection of the VSWR. If the foreign object detection period has elapsed since the detection unit 112 has been controlled so as to start the detection of the VSWR (YES in step S604), the process exits the flowchart illustrated in FIG. 6, and then proceeds to step S511 in the power supply process illustrated in FIG. 5. If the foreign object detection period has elapsed since the detection unit 112 has been controlled so as to start the detection of the VSWR (YES in step S604), the CPU 107 controls the detection unit 112 so as to stop the detection of the VSWR. If the foreign object detection period has not elapsed since the detection unit 112 has been controlled so as to start the detection of the VSWR (NO in step S604), the process returns to step S602. The foreign object detection period in step S604 matches the foreign object detection period included in the power supply status information 402 transmitted to the electronic apparatus 200.

Figure 6:
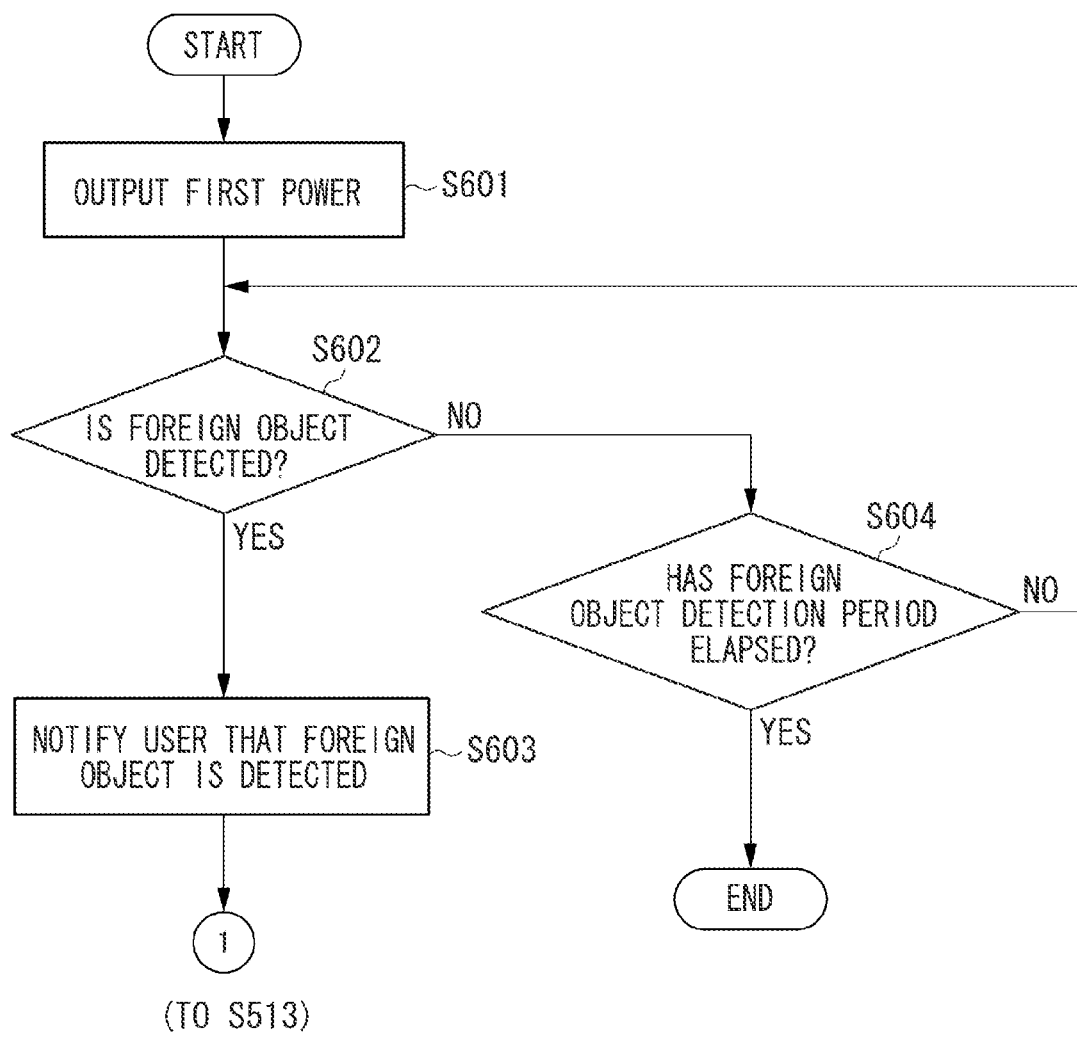
FIG. 6 is a flowchart illustrating an example of the detection process according to the first exemplary embodiment.

In the detection process in FIG. 6, the detection unit 112 continues detecting the VSWR to provide the information indicating the VSWR to the CPU 107 until the foreign object detection period is determined to have elapsed since the execution of the process of step S601 (YES in step S604).

In the detection process in FIG. 6, the CPU 107 causes the first power to be kept outputting via the power supply antenna 106 until the foreign object detection period is determined to have elapsed since the execution of the process of step S601 (YES in step S604).

The CPU 107 is configured to control, in step S601, at least one of the oscillator 102, the power generation unit 103, and the matching circuit 104 so as to output the first power to the electronic apparatus 200. However, the power expected not to be excessive power for the electronic apparatus 200 and the foreign object is not limited to the first power. Therefore, the CPU 107 may be configured to cause, in step S601, power other than the first power to be output to the electronic apparatus 200 as long as the CPU 107 causes the power expected not to be excessive power for the electronic apparatus 200 and the foreign object to be output to the electronic apparatus 200.

(Power Reception Process)

Figure 7B:
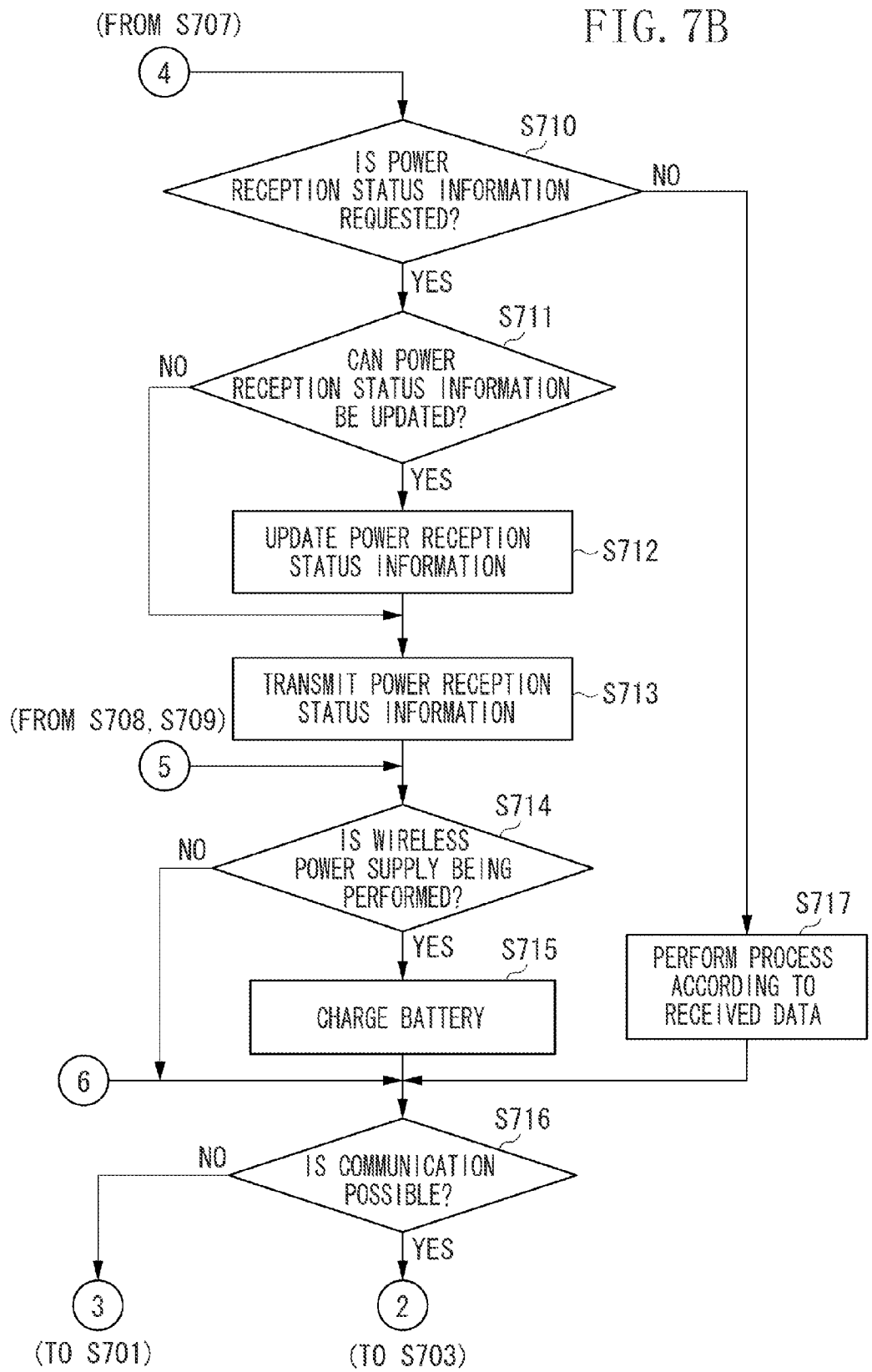
FIG. 7 (consisting of FIGS. 7A and 7B) is a flowchart illustrating an example of the power reception process according to the first exemplary embodiment.

Power reception process performed by the electronic apparatus 200 will be described with reference to a flowchart illustrated in FIG. 7 (consisting of FIGS. 7A and 7B).

When the power reception antenna 201 receives the power from the power supply apparatus 100, and the power received by the power reception antenna 201 is supplied to the communication unit 204, in step S701, the communication unit 204 carries out the authentication for wirelessly communicating with the communication unit 105. After that, the process proceeds to step S702.

In step S702, the communication unit 204 determines whether the authentication for wirelessly communicating with the communication unit 105 is completed. If the authentication for wirelessly communicating with the communication unit 105 is completed (YES in step S702), the process proceeds to step S703. If the authentication for wirelessly communicating with the communication unit 105 is not completed (NO in step S702), the process ends.

In step S703, the communication unit 204 determines whether data is received from the power supply apparatus 100. If data is received from the power supply apparatus 100 by the communication unit 204 (YES in step S703), the process proceeds to step S704. If data is not received from the power supply apparatus 100 by the communication unit 204 (NO in step S703), the process returns to step S703.

In step S704, the communication unit 204 determines whether the power supply status information 402 including the information indicating that the power supply apparatus 100 will stop the wireless power supply to the electronic apparatus 200 is received. If the power supply status information 402 including the information indicating that the power supply apparatus 100 will stop the wireless power supply to the electronic apparatus 200 is stored into the wireless power supply data group 400 in the memory 204a (YES in step S704), the communication unit 204 transmits response data to the power supply apparatus 100. Then, the process ends. If the power supply status information 402 including the information indicating that the power supply apparatus 100 will stop the wireless power supply to the electronic apparatus 200 is not received (NO in step S704), the process proceeds to step S705.

In step S705, the communication unit 204 determines whether the data for requesting the device information 401 is received. If the data for requesting the device information 401 is received (YES in step S705), the process proceeds to step S706. If the data for requesting the device information 401 is not received (NO in step S705), the process proceeds to step S707.

In step S706, the communication unit 204 transmits the device information 401 read out from the wireless power supply data group 400 in the memory 204a to the power supply apparatus 100. Then, the process proceeds to step S716.

In step S707, the communication unit 204 determines whether the power supply status information 402 including the information indicating that the power supply apparatus 100 will start the wireless power supply to the electronic apparatus 200 is received. If the power supply status information 402 including the information indicating that the power supply apparatus 100 will start the wireless power supply to the electronic apparatus 200 is not received (NO in step S707), the process proceeds to step S710. If the power supply status information 402 including the information indicating that the power supply apparatus 100 will start the wireless power supply to the electronic apparatus 200 is stored into the wireless power supply data group 400 in the memory 204a (YES in step S707), the communication unit 204 transmits response data to the power supply apparatus 100. Then, the process proceeds to step S708. If the power supply status information 402 includes the information indicating that the power supply apparatus 100 will carry out the foreign object detection, the communication unit 204 outputs, to the CPU 206, a notification for instructing the CPU 206 to perform the preparation process according to the foreign object detection period included in the power supply status information 402.

In step S708, the CPU 206 determines whether the notification for instructing the CPU 206 to perform the preparation process according to the foreign object detection period is received from the communication unit 204, thereby determining whether the power supply apparatus 100 will carry out the foreign object detection. If the notification for instructing the CPU 206 to perform the preparation process according to the foreign object detection period is received from the communication unit 204 (YES in step S708), the CPU 206 determines that the power supply apparatus 100 will carry out the foreign object detection, and then the process proceeds to step S709. If the notification for instructing the CPU 206 to perform the preparation process according to the foreign object detection period is not received from the communication unit 204 (NO in step S708), the CPU 206 determines that the power supply apparatus 100 will not carry out the foreign object detection, and then the process proceeds to step S714.

In step S709, the CPU 206 performs the preparation process with use of the power supplied from the battery 209. The preparation process will be described below. The preparation process is performed by the electronic apparatus 200 to improve the accuracy for detecting a foreign object by the power supply apparatus 100, when the power supply apparatus 100 performs the detection process illustrated in FIG. 6. Upon the execution of the preparation process, the process proceeds to step S714.

In step S710, the communication unit 204 determines whether the data for requesting the power reception status information 403 is received. If the data for requesting the power reception status information 403 is received (YES in step S710), the process proceeds to step S711. If the data for requesting the power reception status information 403 is received (YES in step S710), the communication unit 204 outputs, to the CPU 206, a notification for instructing the CPU 206 to update the power reception status information 403. If the data for requesting the power reception status information 403 is not received (NO in step S710), the process proceeds to step S717.

In step S711, the CPU 206 determines whether the CPU 206 can update the power reception status information 403. If the CPU 206 can update the power reception status information 403 (YES in step S711), the process proceeds to step S712. If the CPU 206 cannot update the power reception status information 403 (NO in step S711), the process proceeds to step S713.

When the remaining capacity of the battery 209 is the predetermined value or higher, the CPU 206 can update the power reception status information 403 with use of the power supplied from the battery 209 to the CPU 206. When the remaining capacity of the battery 209 is not the predetermined value or higher, since the power supplied from the battery 209 is insufficient as the power to be used to update the power reception status information 403, the CPU 206 cannot update the power reception status information 403.

Further, when the power received from the power supply apparatus 100 by the power reception antenna 201 is the predetermined power or higher, the CPU 206 can update the power reception status information 403 with use of the power received by the power reception antenna 201. When the power received by the power reception antenna 201 is not the predetermined power or higher, since the power received by the power reception antenna 201 is insufficient as the power to be used to update the power reception status information 403, the CPU 206 cannot update the power reception status information 403.

Further, even when the power to be used to update the power reception status information 403 is supplied to the CPU 206, the CPU 206 cannot update the power reception status information 403 if an error occurs in the CPU 206. When the power to be used to update the power reception status information 403 is supplied to the CPU 206, the CPU 206 can update the power reception status information 403 with no error occurring in the CPU 206.

In step S712, the CPU 206 updates the power reception status information 403 in response to the notification received from the communication unit 204. Further, upon completing the update of the power reception status information 403, the CPU 206 adds the specific value to the value of the update data included in the power supply status information 402 stored in step S707, and stores this value of the update data into the power reception status information 403. Then, the process proceeds to step S713.

In step S713, the communication unit 204 transmits the power reception status information 403 stored in the wireless power supply data group 400 in the memory 204a during the period since the data for requesting the power reception status information 403 has been received until the response time has elapsed. Then, the process proceeds to step S714. If the CPU 206 can update the power reception status information 403 (YES in step S711), the communication unit 204 transmits the power reception status information 403 updated by the CPU 206 in step S712 to the power supply apparatus 100. If the CPU 206 cannot update the power reception status information 403 (NO in step S711), the communication unit 204 transmits the power reception status information 403 that is not updated by the CPU 206 to the power supply apparatus 100.

In step S714, the electronic apparatus 200 determines whether the power for charging the battery 209 is being supplied from the power supply apparatus 100 to the electronic apparatus 200. For example, the electronic apparatus 200 determines whether the power for charging the battery 209 is being supplied from the power supply apparatus 100 to the electronic apparatus 200, according to whether the direct-current power is being supplied from the rectification and smoothing circuit 203 to the regulator 205. If any one of the first power and the second power is being output from the power supply apparatus 100 via the power supply antenna 106, the direct-current power is being supplied from the rectification and smoothing circuit 203 to the regulator 205. In this case, the electronic apparatus 200 determines that the power for charging the battery 209 is being supplied from the power supply apparatus 100 to the electronic apparatus 200 (YES in step S714). If the direct-current power is being supplied from the rectification and smoothing circuit 203 to the regulator 205 (YES in step S714), the process proceeds to step S715. If the first power and the second power are not being output from the power supply apparatus 100 via the power supply antenna 106, the direct-current power is not being supplied from the rectification and smoothing circuit 203 to the regulator 205. In this case, the electronic apparatus 200 determines that the power for charging the battery 209 is not being supplied from the power supply apparatus 100 to the electronic apparatus 200 (NO in step S714). If the direct-current power is not being supplied from the rectification and smoothing circuit 203 to the regulator 205 (NO in step S714), the process proceeds to step S716.

In step S715, the charging unit 208 charges the battery 209 with use of the power supplied from the regulator 205. Then, the process proceeds to step S716.

In step S716, the communication unit 204 determines whether the communication unit 204 can wirelessly communicate with the power supply apparatus 100. If the communication unit 204 determines that the communication unit 204 can wirelessly communicate with the power supply apparatus 100 (YES in step S716), the process returns to step S703. If the communication unit 204 determines that the communication unit 204 cannot wirelessly communicate with the power supply apparatus 100 (NO in step S716), the process returns to step S701.

In step S717, the communication unit 204 outputs, to the CPU 206, a notification for causing the CPU 206 to perform a process corresponding to the data received from the power supply apparatus 100. After that, the CPU 206 controls the electronic apparatus 200 according to the notification from the communication unit 204. Then, the process proceeds to step S716.

(Preparation Process)

Next, the preparation process performed by the CPU 206 in step S709 illustrated in FIG. 7 will be described with reference to a flowchart illustrated in FIG. 8. The CPU 206 executes the computer program stored in the memory 207, by which the preparation process can be realized. The CPU 206 performs the preparation process illustrated in FIG. 8 with use of the power supplied from the battery 209.

When the power from the power supply apparatus 100 is supplied to at least one of the charging unit 208, the system 210, and the battery 209, the VSWR detected by the detection unit 112 changes according to the power consumed by at least one of the charging unit 208, the system 210, and the battery 209. Therefore, in the detection process illustrated in FIG. 6, the CPU 107 may make an incorrect determination of misinterpreting the change in the VSWR actually due to the change in the power consumed by the electronic apparatus 200 as the change in the VSWR due to a foreign object placed in the vicinity of the power supply apparatus 100. In this case, the CPU 107 stops the wireless power supply to the electronic apparatus 200 even though there is actually no foreign object within the predetermined range, whereby the power supply apparatus 100 fails to appropriately control the wireless power supply to the electronic apparatus 200. To prevent such a situation, the electronic apparatus 200 performs a process of step S801 to eliminate or reduce an influence due to the change in the power consumed by the electronic apparatus 200.

In step S801, the CPU 206 starts a process for keeping the load of the electronic apparatus 200 constant to improve the accuracy for detecting a foreign object by the power supply apparatus 100. For example, the CPU 206 disconnects the rectification and smoothing circuit 203 and the regulator 105 from each other, thereby prohibiting the direct-current power from being supplied from the rectification and smoothing circuit 203 to the regulator 205. As a result, the power received by the power reception antenna 201 is not supplied to the charging unit 208, the system 210, and the battery 209, which can lead to prevention or a reduction of the change in the load of the electronic apparatus 200 and thus an elimination or a reduction of the influence from the change in the power consumed by the electronic apparatus 200. Further, the CPU 206 performs control so as to prohibit the power discharged from the battery 209 from being supplied to the system 210 and the operation unit 213. This control can lead to a reduction in the change in the load of the electronic apparatus 200 and thus a reduction in the influence due to the change in the power consumed by the electronic apparatus 200. Upon the execution of the process of step S801, the CPU 206 controls the timer 214 so as to measure a time elapsed since the start of the process for keeping the load of the electronic apparatus 200 constant. Upon the execution of the process of step S801, the process proceeds to step S802.

In step S802, the CPU 206 determines whether the foreign object detection period has elapsed since the start of the process for keeping the load of the electronic apparatus 200 constant. If the time measured by the timer 214 reaches the foreign object detection period included in the power supply status information 402, the CPU 206 determines that the foreign object detection period has elapsed (YES in step S802). If the time measured by the timer 214 does not reach the foreign object detection period included in the power supply status information 402, the CPU 206 determines that the foreign object detection period has not elapsed (NO in step S802). If the foreign object detection period has not elapsed (NO in step S802), the process returns to step S802. If the foreign object detection period has elapsed (YES in step S802), the process exits the flowchart illustrated in FIG. 8, and then proceeds to step S714 in the power reception process illustrated in FIG. 7. If the foreign object detection period has elapsed (YES in step S802), the CPU 206 stops the process for keeping the load of the electronic apparatus 200 constant, and restores the state of the load of the electronic apparatus 200 to its original state.

Figure 8:
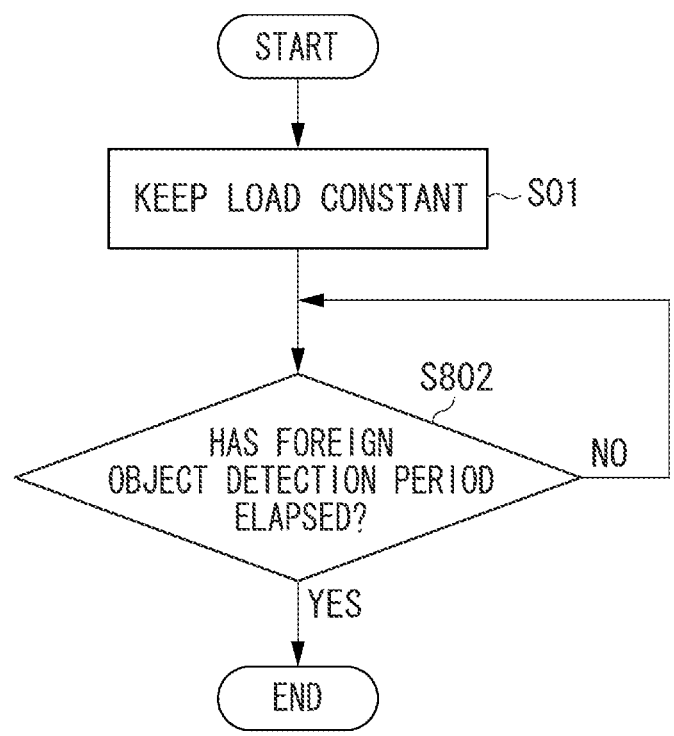
FIG. 8 is a flowchart illustrating an example of the preparation process according to the first exemplary embodiment.

In the preparation process illustrated in FIG. 8, the CUP 206 continues the process for keeping the load of the electronic apparatus 200 constant until the foreign object detection period is determined to have elapsed (YES in step S802).

Next, an operation of the power supply apparatus 100 when the power supply process illustrated in FIG. 5 is performed by the power supply apparatus 100 will be described with reference to FIG. 9. A horizontal axis and a vertical axis illustrated in FIG. 9 represent the time and the power output from the power supply apparatus 100, respectively.

If the power reception status information 403 is not received by the communication unit 105 (NO in step S507), the power supply apparatus 100 performs operations of authentication 901, communication 902, and a first power output 903. If the power reception status information 403 is not updated (NO in step S508), the power supply apparatus 100 also performs the operations of the authentication 901, the communication 902, and the first power output 903.

The authentication 901 is the authentication operation for wirelessly communicating with the communication unit 204. The communication 902 is the operation for acquiring the power reception status information 403 from the electronic apparatus 200. The first power output 903 is the operation of outputting the first power.

After outputting the first power by the operation of the first power output 903, the power supply apparatus 100 performs operations of authentication 904 and communication 905. The authentication 904 is a similar operation to the authentication 901, and the communication 905 is a similar operation to the communication 902. If determining that the power reception status information 403 is updated (YES in step S508) after acquiring the power reception status information 403 from the electronic apparatus 200 by the operation of the communication 905 (YES in step S507), the power supply apparatus 100 performs an operation of foreign object detection 906. The foreign object detection 906 is the operation for detecting whether there is a foreign object within the predetermined range. After determining that there is no foreign object within the predetermined range by the operation of the foreign object detection 906 (NO in step S602), the power supply apparatus 100 performs an operation of a second power output 907. The second power output 907 is the operation of outputting the second power with use of the power reception status information 403 acquired from the electronic apparatus 200 by the operation of the communication 905. After performing the operation of the second power output 907, the power supply apparatus 100 performs an operation of communication 908. The communication 908 is a similar operation to the communication 902. After performing the operation of the communication 908, the power supply apparatus 100 performs operations of foreign object detection 909 and a second power output 910. The foreign object detection 909 is a similar operation to the foreign object detection 906, and the second power output 910 is a similar operation to the second power output 907. After that, the power supply apparatus 100 repeatedly performs the operations of the communication 908, the foreign object detection 909, and the second power output 910 until determining not to supply the power to the electronic apparatus 200 (NO in step S509), or determining that there is a foreign object within the predetermined range (YES in step S602).

In this manner, the power supply apparatus 100 according to the first exemplary embodiment is configured to control the wireless power supply to the electronic apparatus 200 according to whether the power reception status information 403 received from the electronic apparatus 200 is updated by the electronic apparatus 200. Further, the power supply apparatus 100 is configured to control whether to perform the process for detecting a foreign object according to whether the power reception status information 403 received from the electronic apparatus 200 is updated by the electronic apparatus 200.

This configuration allows the power supply apparatus 100 to supply the required power to the electronic apparatus 200 with use of the power reception status information 403 determined to be correct, when the power reception status information 403 received from the electronic apparatus 200 is updated by the electronic apparatus 200. Further, this configuration allows the power supply apparatus 100 to perform the process for detecting a foreign object, and control the wireless power supply according to whether there is a foreign object, when the power reception status information 403 received from the electronic apparatus 200 is updated by the electronic apparatus 200. As a result, when there is a foreign object in the vicinity of the power supply apparatus 100, the power supply apparatus 100 can prevent the wireless power supply to the electronic apparatus 200 from affecting the foreign object, thereby succeeding in appropriately controlling the wireless power supply to the electronic apparatus 200.

Further, the power supply apparatus 100 is configured to refrain from using the power reception status information 403 determined to be incorrect, if the power reception status information 403 received from the electronic apparatus 200 is not updated by the electronic apparatus 200 (NO in step S508). This configuration can prevent the power supply apparatus 100 from performing incorrect control on the electronic apparatus 200. Further, the power supply apparatus 100 is configured to supply the power slight enough not to be influential on a foreign object to the electronic apparatus 200, if the power reception status information 403 received from the electronic apparatus 200 is not updated by the electronic apparatus 200 (NO in step S508). As a result, the power supply apparatus 100 can wirelessly supply the power to the electronic apparatus 200 while preventing the wireless power supply to the electronic apparatus 200 from affecting the foreign object even without performing the process for detecting a foreign object, thereby succeeding in appropriately controlling the wireless power supply to the electronic apparatus 200.

Therefore, the power supply apparatus 100 can realize the appropriate execution of the foreign object detection, and the appropriate control of the wireless power supply to the electronic apparatus 200.

In the first exemplary embodiment, the power supply apparatus 100 is configured to perform the process of step S514 without performing the process for detecting a foreign object, if the power reception status information 403 is not received from the electronic apparatus 200 (NO in step S507). However, the power supply process is not limited thereto. For example, the power supply apparatus 100 may be configured to determine whether a foreign object is detected by different process from the detection process illustrated in FIG. 6 before performing the process of step S514, if the power reception status information 403 is not received from the electronic apparatus 200 (NO in step S507). Alternatively, for example, the power supply apparatus 100 may be configured to determine whether a foreign object is detected by simpler process than the detection process illustrated in FIG. 6 before performing the process of step S514, if the power reception status information 403 is not received from the electronic apparatus 200 (NO in step S507). If a foreign object is detected before the process of step S514 is performed, the power supply apparatus 100 controls at least one of the display unit 110 and the LED 113 so as to notify the user that a foreign object is detected, and performs the process of step S514 for wirelessly supplying the power to the electronic apparatus 200.

In the first exemplary embodiment, the power supply apparatus 100 is configured to perform the process of step S514 without performing the process for detecting a foreign object, if the power reception status information 403 is not updated by the electronic apparatus 200 (NO in step S508). However, the power supply process is not limited thereto. For example, the power supply apparatus 100 may be configured to determine whether a foreign object is detected by different process from the detection process illustrated in FIG. 6 before performing the process of step S514, if the power reception status information 403 is not updated by the electronic apparatus 200 (NO in step S508). Alternatively, for example, the power supply apparatus 100 may be configured to determine whether a foreign object is detected by simpler process than the detection process illustrated in FIG. 6 before performing the process of step S514, if the power reception status information 403 is not updated by the electronic apparatus 200 (NO in step S508). If a foreign object is detected before the process of step S514 is performed, the power supply apparatus 100 controls at least one of the display unit 110 and the LED 113 so as to notify the user that a foreign object is detected, and performs the process of step S514 for wirelessly supplying the power to the electronic apparatus 200.

In the first exemplary embodiment, the detection unit 112 is configured to detect the VSWR, and the CPU 107 is configured to detect whether a foreign object is placed in the vicinity of the power supply apparatus 100 with use of the data indicating the VSWR that the CPU 107 is notified of from the detection unit 112. However, the method for detecting a foreign object is not limited thereto.

For example, the detection unit 112 may be configured to detect the current flowing in the power supply antenna 106, instead of the VSWR. In this case, in step S602, the CPU 107 determines whether there is a foreign object within the predetermined range with use of data indicating the current flowing in the power supply antenna 106 that is provided from the detection unit 112. If an amount of a change in the current detected by the detection unit 112 is a second value or larger, the CPU 107 determines that there is a foreign object within the predetermined range. The second value is a value corresponding to an amount by which the current is expected to change when a foreign object is placed within the predetermined range. In this case, if the amount of the change in the current detected by the detection unit 112 is not the second value or larger, the CPU 107 determines that there is no foreign object within the predetermined range.

Alternatively, for example, the detection unit 112 may be configured to detect a voltage of the power supply antenna 106, instead of the VSWR. In this case, in step S602, the CPU 107 determines whether there is a foreign object within the predetermined range with use of data indicating the voltage of the power supply antenna 106 that is provided from the detection unit 112. If an amount of a change in the voltage detected by the detection unit 112 is a third value or larger, the CPU 107 determines that there is a foreign object within the predetermined range. The third value is a value corresponding to an amount by which the voltage is expected to change when a foreign object is placed within the predetermined range. In this case, if the amount of the change in the voltage detected by the detection unit 112 is not the third value or larger, the CPU 107 determines that there is no foreign object within the predetermined range.

In the first exemplary embodiment, the power supply apparatus 100 and the electronic apparatus 200 are assumed to wirelessly communicate with each other based on the NFC standard. However, the power supply apparatus 100 and the electronic apparatus 200 may wirelessly communicate with each other based on another standard than the NFC standard. For example, the power supply apparatus 100 and the electronic apparatus 200 may perform wireless communication in compliance with the International Organization for Standardization (ISO)/International Electrotechnical Commission (IEC) 18092 standard, instead of the NFC standard. Alternatively, the power supply apparatus 100 and the electronic apparatus 200 may perform wireless communication in compliance with Radio Frequency IDentification (RFID), instead of the NFC standard. Alternatively, the power supply apparatus 100 and the electronic apparatus 200 may perform wireless communication in compliance with the ISO/IEC 14443 standard, instead of the NFC standard. Alternatively, the power supply apparatus 100 and the electronic apparatus 200 may perform wireless communication in compliance with the TransferJet (registered trademark) standard, instead of the NFC standard. Alternatively, the power supply apparatus 100 and the electronic apparatus 200 may perform wireless communication in compliance with the ISO/IEC 21481 standard, instead of the NFC standard. Alternatively, the power supply apparatus 100 and the electronic apparatus 200 may perform wireless communication in compliance with the Bluetooth (registered trademark) standard or a wireless local area network (LAN) standard, instead of the NFC standard.

In the first exemplary embodiment, the power supply apparatus 100 is configured to supply the second power to the electronic apparatus 200 with use of the power supply antenna 106, and perform the communication between the communication unit 105 and the electronic apparatus 200 with use of the power supply antenna 106. However, the use of the antenna is not limited thereto. For example, the power supply apparatus 100 may be configured to separately include an antenna for supplying the second power to the electronic apparatus 200, and an antenna for performing the communication between the communication unit 105 and the electronic apparatus 200. Therefore, a resonance frequency corresponding to the antenna for supplying the second power to the electronic apparatus 200, and a resonance frequency corresponding to the antenna for performing the communication between the communication unit 105 and the electronic apparatus 200 may be equal frequencies, or may be different frequencies. In this case, the resonance frequency corresponding to the antenna for supplying the second power to the electronic apparatus 200 may be 6.78 MHz, or may be a frequency of 100 KHz to 250 KHz. The resonance frequency corresponding to the antenna for performing the communication between the communication unit 105 and the electronic apparatus 200 may be another frequency than 13.56 MHz as long as this frequency is a frequency in compliance with the communication standard of the communication unit 105.

Further, the electronic apparatus 200 is configured to receive the power from the power supply apparatus 100 with use of the power reception antenna 201, and perform the communication between the power supply apparatus 100 and the communication unit 204 with use of the power reception antenna 201. However, the use of the antenna is not limited thereto. For example, the electronic apparatus 200 may be configured to separately include an antenna for receiving the power from the power supply apparatus 100, and an antenna for performing the communication between the power supply apparatus 100 and the communication unit 204. Therefore, a resonance frequency corresponding to the antenna for receiving the power from the power supply apparatus 100, and a resonance frequency corresponding to the antenna for performing the communication between the power supply apparatus 100 and the communication unit 204 may be equal frequencies, or may be different frequencies. In this case, the resonance frequency corresponding to the antenna for receiving the power from the power supply apparatus 100 may be 6.78 MHz, or may be a frequency of 100 KHz to 250 KHz. The resonance frequency corresponding to the antenna for performing the communication between the power supply apparatus 100 and the communication unit 204 may be another frequency than 13.56 MHz as long as this frequency is a frequency in compliance with the communication standard of the communication unit 204.

The power supply apparatus 100 according to the present invention is not limited to the power supply apparatus 100 described in the first exemplary embodiment. Further, the electronic apparatus 200 according to the present invention is also not limited to the electronic apparatus 200 described in the first exemplary embodiment. For example, each of the power supply apparatus 100 and the electronic apparatus 200 according to the present invention can be also realized by a system including a plurality of apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-192880, filed Sep. 22, 2014, which is hereby incorporated by reference herein in its entirety.

What is claimed is:

1. A power supply apparatus comprising:
   a power supply unit configured to wirelessly supply power to an electronic apparatus;
   a communication unit configured to receive information regarding the electronic apparatus from the electronic apparatus; and
   a control unit configured to control whether to perform a process for detecting a foreign object according to whether the information is updated by the electronic apparatus,
   wherein the control unit controls the power supply unit so as to supply first power to the electronic apparatus, if the information is determined not to be updated by the electronic apparatus, and
   wherein the control unit controls the power supply unit so as to supply second power, which is set based on the information, to the electronic apparatus according to non-detection of the foreign object, if the information is determined to be updated by the electronic apparatus.

2. The power supply apparatus according to claim 1, wherein the control unit performs the process for detecting the foreign object, if the information is determined to be updated by the electronic apparatus.

3. The power supply apparatus according to claim 1, wherein the control unit refrains from performing the process for detecting the foreign object, if the information is determined to be not updated by the electronic apparatus.

4. The power supply apparatus according to claim 1,
   wherein the control unit controls the power supply unit so as to supply first power to the electronic apparatus even when the foreign object is detected, if the information is determined not to be updated by the electronic apparatus, and
   wherein the control unit controls the power supply unit so as to refrain from supplying second power, which is set based on the information, to the electronic apparatus according to detection of the foreign object before the power is supplied to the electronic apparatus, if the information is determined to be updated by the electronic apparatus.

5. The power supply apparatus according to claim 1, wherein the first power is lower than the second power.

6. The power supply apparatus according to claim 1, wherein the control unit controls the power supply unit so as to refrain from supplying higher power than the first power to the electronic apparatus until the information is determined to be updated by the electronic apparatus, if the information is determined not to be updated by the electronic apparatus.

7. The power supply apparatus according to claim 1, further comprising a notification unit configured to issue a notification indicating that the power supply apparatus supplies the power to the electronic apparatus, in a case where any one of the first power and the second power is supplied from the power supply unit to allow the electronic apparatus to charge a battery.

8. The power supply apparatus according to claim 1, wherein the control unit determines whether the information is updated by the electronic apparatus with use of information received from the electronic apparatus by the communication unit.

9. The power supply apparatus according to claim 1, wherein the information includes at least one of information indicating whether an error occurs in the electronic apparatus, information regarding a battery of the electronic apparatus, information regarding charging of the battery of the electronic apparatus, information indicating whether the electronic apparatus requests the power supply apparatus to supply the power, and information used for the electronic apparatus to request the power supply apparatus to increase or reduce the power.

10. A method for controlling a power supply apparatus, the method comprising:
supplying power wirelessly to an electronic apparatus;
receiving information regarding the electronic apparatus from the electronic apparatus; and
controlling whether to perform a process for detecting a foreign object according to whether the information is updated by the electronic apparatus,
wherein the wireless power supply is controlled so as to supply first power to the electronic apparatus, if the information is determined not to be updated by the electronic apparatus, and
wherein the wireless power supply is controlled so as to supply second power, which is set based on the information, to the electronic apparatus according to non-detection of the foreign object, if the information is determined to be updated by the electronic apparatus.

11. The method for controlling the power supply apparatus according to claim 10, wherein the process for detecting the foreign object is performed, if the information is determined to be updated by the electronic apparatus.

12. The method for controlling the power supply apparatus according to claim 10, wherein the process for detecting the foreign object is refrained from performing, if the information is determined not to be updated by the electronic apparatus.

13. The method for controlling the power supply apparatus according to claim 10,
wherein the wireless power supply is controlled so as to supply first power to the electronic apparatus even when the foreign object is detected, if the information is determined to be not updated by the electronic apparatus, and
wherein the wireless power supply is controlled so as to refrain from supplying second power, which is set based on the information, to the electronic apparatus according to detection of the foreign object before the power is supplied to the electronic apparatus, if the information is determined to be updated by the electronic apparatus.

14. The method for controlling the power supply apparatus according to claim 10, wherein the first power is lower than the second power.

15. The method for controlling the power supply apparatus according to claim 10, wherein the wireless power supply is controlled so as to refrain from supplying higher power than the first power to the electronic apparatus until the information is determined to be updated by the electronic apparatus, if the information is determined not to be updated by the electronic apparatus.

16. The method for controlling the power supply apparatus according to claim 10, further comprising issuing a notification indicating that the power supply apparatus supplies the power to the electronic apparatus, when any one of the first power and the second power is supplied to allow the electronic apparatus to charge a battery.

17. The method for controlling the power supply apparatus according to claim 10, wherein it is determined whether the information is updated by the electronic apparatus with use of information received from the electronic apparatus.

18. The method for controlling the power supply apparatus according to claim 10, wherein the information includes at least one of information indicating whether an error occurs in the electronic apparatus, information regarding a battery of the electronic apparatus, information regarding charging of the battery of the electronic apparatus, information indicating whether the electronic apparatus requests the power supply apparatus to supply the power, and information used for the electronic apparatus to request the power supply apparatus to increase or reduce the power.

19. A non-transitory computer-readable storage medium which stores a program for causing a power supply apparatus to execute a method, the method comprising:
supplying power wirelessly to an electronic apparatus;
receiving information regarding the electronic apparatus from the electronic apparatus; and
controlling whether to perform a process for detecting a foreign object according to whether the information is updated by the electronic apparatus,
wherein the wireless power supply is controlled so as to supply first power to the electronic apparatus, if the information is determined not to be updated by the electronic apparatus, and
wherein the wireless power supply is controlled so as to supply second power, which is set based on the information, to the electronic apparatus according to non-detection of the foreign object, if the information is determined to be updated by the electronic apparatus.

* * * * *